(12) United States Patent
Iida et al.

(10) Patent No.: US 11,354,551 B2
(45) Date of Patent: *Jun. 7, 2022

(54) PRINTING APPARATUS THAT DISPLAYS SHEET INFORMATION OF SHEET TO NOTIFY A STATUS OF THE SHEET, AND STORAGE MEDIUM

(71) Applicant: CANON KABUSHIKI KAISHA, Tokyo (JP)

(72) Inventors: Toshihiko Iida, Yokohama (JP); Koichi Watanabe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,782

(22) Filed: Jul. 30, 2019

(65) Prior Publication Data

US 2019/0354820 A1 Nov. 21, 2019

Related U.S. Application Data

(63) Continuation of application No. 14/208,260, filed on Mar. 13, 2014, now Pat. No. 10,417,538.

(30) Foreign Application Priority Data

Mar. 18, 2013 (JP) .................................. 2013-055414
Feb. 18, 2014 (JP) .................................. 2014-028967

(51) Int. Cl.
*G06K 15/00* (2006.01)
*G06K 15/02* (2006.01)
(Continued)

(52) U.S. Cl.
CPC ......... *G06K 15/4065* (2013.01); *B41J 11/003* (2013.01); *G06K 15/16* (2013.01);
(Continued)

(58) Field of Classification Search
None
See application file for complete search history.

(56) References Cited

U.S. PATENT DOCUMENTS 6,810,219 B2 10/2004 Yokobori et al.
7,280,782 B2 * 10/2007 Maeda ............... G03G 15/5095
399/81
(Continued)

FOREIGN PATENT DOCUMENTS

JP H0867410 A 3/1996
JP H09267536 A 10/1997
(Continued)

OTHER PUBLICATIONS

Office Action issued in Japanese Appln. No. 2014-028967 dated Dec. 4, 2017.
(Continued)

*Primary Examiner* — Haris Sabah
(74) *Attorney, Agent, or Firm* — Rossi, Kimms & McDowell LLP

(57) ABSTRACT

A printing apparatus has a sheet holding unit having a detection unit for detecting a size of a sheet which is held and a storage unit configured to store sheet information including at least a size of a sheet as information representing a sheet. The apparatus sets first sheet information selected by a user in association with the sheet holding unit from a plurality of items of sheet information stored in the storage unit and notifies the user of a mismatch in a case where a size of a sheet that the first sheet information set in the setting indicates, and a size of a sheet detected by the detection unit are mismatched.

8 Claims, 22 Drawing Sheets

(51) Int. Cl.
   *B41J 11/00*     (2006.01)
   *G06K 15/16*     (2006.01)
   *G03G 15/00*     (2006.01)
(52) U.S. Cl.
   CPC ....... *G06K 15/1882* (2013.01); *G03G 15/605* (2013.01); *G03G 15/607* (2013.01); *G03G 15/6502* (2013.01); *G03G 2215/00126* (2013.01); *G03G 2215/00329* (2013.01)

(56) References Cited

U.S. PATENT DOCUMENTS

| | | | |
|---|---|---|---|
| 10,417,538 B2* | 9/2019 | Iida | G06K 15/1882 |
| 2005/0105146 A1* | 5/2005 | Tanaka | G03G 15/6508 358/498 |
| 2005/0196211 A1* | 9/2005 | Miki | B65H 1/266 399/389 |
| 2006/0262355 A1 | 11/2006 | Kurata et al. | |
| 2007/0063425 A1 | 3/2007 | Tsujinishi | |
| 2008/0069583 A1 | 3/2008 | Takeuchi | |
| 2008/0219685 A1 | 9/2008 | Muratani | |
| 2009/0081001 A1 | 3/2009 | Ota et al. | |
| 2009/0190936 A1 | 7/2009 | Masui et al. | |
| 2010/0245859 A1* | 9/2010 | Morgan | H04N 1/00708 358/1.9 |
| 2011/0051162 A1 | 3/2011 | Okada | |
| 2012/0027477 A1* | 2/2012 | Nakayama | G03G 15/2064 399/328 |
| 2012/0049442 A1 | 3/2012 | Sekiguchi et al. | |
| 2012/0236333 A1 | 9/2012 | Kiuchi et al. | |
| 2012/0286465 A1* | 11/2012 | Ooba | B65H 5/26 271/9.01 |

FOREIGN PATENT DOCUMENTS

| | | |
|---|---|---|
| JP | H09301545 A | 11/1997 |
| JP | 2001166641 A | 6/2001 |
| JP | 2005194012 A | 7/2005 |
| JP | 2006027846 A | 2/2006 |
| JP | 2006184760 A | 7/2006 |
| JP | 2006201658 A | 8/2006 |
| JP | 2007047662 A | 2/2007 |
| JP | 2007301911 A | 11/2007 |
| JP | 2009128396 A | 6/2009 |
| JP | 2009292033 A | 12/2009 |
| JP | 2010145513 A | 7/2010 |
| JP | 2011112836 A | 6/2011 |
| JP | 2011248095 A | 12/2011 |
| JP | 2011253073 A | 12/2011 |
| JP | 2012012219 A | 1/2012 |
| JP | 2012098478 A | 5/2012 |
| JP | 2012189797 A | 10/2012 |
| JP | 2014205343 A | 10/2014 |

OTHER PUBLICATIONS

Office Action issued in Japanese Appln. No. 2014-028967 dated Feb. 16, 2018.
Office Action issued in Japanese Appln. No. 2018-148835 dated May 27, 2019.
Office Action issued in U.S. Appl. No. 14/208,260 dated Aug. 4, 2014.
Office Action issued in U.S. Appl. No. 14/208,260 dated Jan. 29, 2015.
Office Action issued in U.S. Appl. No. 14/208,260 dated Apr. 20, 2015.
Office Action issued in U.S. Appl. No. 14/208,260 dated Oct. 22, 2015.
Office Action issued in U.S. Appl. No. 14/208,260 dated Apr. 15, 2016.
Office Action issued in U.S. Appl. No. 14/208,260 dated Nov. 10, 2016.
Office Action issued in U.S. Appl. No. 14/208,260 dated May 23, 2017.
Office Action issued in U.S. Appl. No. 14/208,260 dated Jan. 24, 2018.
Office Action issued in U.S. Appl. No. 14/208,260 dated May 31, 2018.
Office Action issued in U.S. Appl. No. 14/208,260 dated Jan. 28, 2019.
Notice of Allowance issued in U.S. Appl. No. 14/208,260 dated May 6, 2019.
Office Action issued in Japanese Appln. No. 2020-010318 dated Nov. 13, 2020.
Office Action issued in Japanese Appln. No. 2021-098162 dated Mar. 11, 2022.

* cited by examiner

FIG. 3

```
MEDIA INFORMATION SETTING
┌─────────────────────────────────────────────────────────────┐
│ ■ NAME                                              [CHANGE]│
│   Paper_Res                                                 │
│ ■ SIZE                        ▶ RES                 [CHANGE]│
│ ■ GRAMMAGE                    ▶ RES                 [CHANGE]│
│ ■ SURFACE CHARACTERISTICS     ▶ HIGH QUALITY PAPER  [CHANGE]│
│ ■ SPECIAL CHARACTERISTICS     ▶ NONE                [CHANGE]│
│ ■ COLOR                       ▶ WHITE               [CHANGE]│
│ ■ CREEP (SHIFT) CORRECTION AMOUNT ADJUSTMENT ▶ NONE [CHANGE]│
│ ■ IMAGE POSITION ADJUSTMENT   ▶ NO ADJUSTMENT       [CHANGE]│
└─────────────────────────────────────────────────────────────┘
                                           [ OK ]  [ CANCEL ]
```

FIG. 4

```
MEDIA INFORMATION SETTING
┌─────────────────────────────────────────────────────────────┐
│ ■ NAME                                              [ SET ] │──401
│   Paper_Res                                                 │
│ ■ SIZE                        ▶ RES                 [ SET ] │──402
│ ■ GRAMMAGE                    ▶ RES                 [ SET ] │──403
│ ■ SURFACE CHARACTERISTICS     ▶ HIGH QUALITY PAPER          │
│ ■ SPECIAL CHARACTERISTICS     ▶ NONE                        │
│ ■ COLOR                       ▶ WHITE                       │
│ ■ CREEP (SHIFT) CORRECTION AMOUNT ADJUSTMENT ▶ NONE         │
│ ■ IMAGE POSITION ADJUSTMENT   ▶ NO ADJUSTMENT               │
└─────────────────────────────────────────────────────────────┘
                           [USE TEMPORARILY] [NEWLY REGISTER]
                                   404             405
```

FIG. 5A

SET/REGISTER
● ALL ▼

501

| NAME | GRAMMAGE | SIZE |
|---|---|---|
| Paper | 100g/m² | A4 |
| Paper_Res | RES | RES |
| AAA | 58g/m² | LTR |
| BBB | 77g/m² | A3 |
| CCC | 128g/m² | B4 |
| DDD | 68g/m² | A4 |
| EEE | 72g/m² | 11x17 |

[DETAILS] [CREATE] [CANCEL]

FIG. 5B

SET/REGISTER
● ALL ▼

| NAME | GRAMMAGE | SIZE |
|---|---|---|
| Paper_Res | RES | RES |
| AAA | 58g/m² | LTR |
| BBB | 77g/m² | A3 |
| CCC | 128g/m² | B4 |
| DDD | 68g/m² | A4 |
| EEE | 72g/m² | 11x17 |
| FFF | 90g/m² | A5 |

[DETAILS] [CREATE] [CANCEL]

FIG. 7

```
MEDIA INFORMATION SETTING
┌─────────────────────────────────────────────────────┐
│ ■ NAME                                              │
│   Paper_Res                                  [SET]  │──401
│ ■ SIZE                    ▶ A4                      │
│ ■ GRAMMAGE                ▶ 85g/m²                  │
│ ■ SURFACE CHARACTERISTICS ▶ HIGH QUALITY PAPER      │
│ ■ SPECIAL CHARACTERISTICS ▶ NONE                    │
│ ■ COLOR                   ▶ RES              [SET]  │
│ ■ CREEP (SHIFT) CORRECTION AMOUNT ADJUSTMENT ▶ RES [SET] │
│ ■ IMAGE POSITION ADJUSTMENT ▶ NO ADJUSTMENT         │
└─────────────────────────────────────────────────────┘
                          [USE TEMPORARILY] [NEWLY REGISTER]
                                  404              405
```

FIG. 8

```
MEDIA
  ⚠ A MEDIA TYPE HAVING THE SAME VALUE EXISTS.
    REGISTER THIS MEDIA TYPE?

[OK]    [CANCEL]
                               802      803
```

FIG. 9A

SET/REGISTER

● ALL ▼

| NAME | GRAMMAGE | SIZE |
|---|---|---|
| Paper_Res | 85g/m² | RES |
| AAA | 58g/m² | LTR |
| BBB | 77g/m² | A3 |
| CCC | 128g/m² | B4 |
| DDD | 68g/m² | A4 |
| EEE | 72g/m² | 11x17 |
| FFF | 90g/m² | A5 |

902

[DETAILS] [CREATE] [CANCEL]

FIG. 9B

SET/REGISTER

● ALL ▼

| NAME | GRAMMAGE | SIZE |
|---|---|---|
| Paper_A4 | 85g/m² | A4 |
| Paper_LTR | 85g/m² | LTR |
| Paper_A3 | 85g/m² | A3 |
| Paper_B4 | 85g/m² | B4 |
| Paper_11x17 | 85g/m² | A4 |
| AAA | 58g/m² | LTR |
| BBB | 77g/m² | A3 |

903

[DETAILS] [CREATE] [CANCEL]

|  | TYPE | GRAMMAGE | SIZE | DETECTION MODE |
|---|---|---|---|---|
| CASSETTE 1 | PLAIN PAPER | 100g/m$^2$ | A4 | AUTO |
| CASSETTE 2 | PLAIN PAPER | 100g/m$^2$ | A3 | MANUAL |
| CASSETTE 3 | THIN PAPER | 70g/m$^2$ | A5 | AUTO |
| CASSETTE 4 | THICK PAPER | 110g/m$^2$ | B5 | AUTO |

FIG. 17C

| PAPER REGISTRATION | | |
|---|---|---|
| <PAPER SETTING: PAPER INFORMATION> REGISTER PAPER TYPE | | 1706 |
| PAPER TYPE | THIN PAPER 2 | CHANGE |
| GRAMMAGE | 70g/m² | CHANGE |
| SIZE | NOT SET | CHANGE |

PAPER SETTING

PLEASE SELECT PAPER FEED LOCATION TO SET PAPER TYPE

1709 — SET

| 1 | A4 |
| 2 | A3 |
| 3 | A5 |
| 4 | B5 |

1708

CLOSE

FIG. 17E

| PAPER INFORMATION SETTING | | |
|---|---|---|
| <PAPER INFORMATION SETTING> SELECT PAPER TYPE | | |

| PAPER TYPE | GRAMMAGE | SIZE |
|---|---|---|
| THIN PAPER | $70 g/m^2$ | A3 |
| THICK PAPER | $110 g/m^2$ | A4 |
| PLAIN PAPER | $100 g/m^2$ | NOT SET |

1710

| CANCEL | OK |
|---|---|

FIG. 20

| | AUTO DETECT | PAPER INFORMATION | CONSISTENCY |
|---|---|---|---|
| 1 A4 | A4 | A4 | MATCHING |
| 2 A3 | A4 | A3 | NOT MATCHING |
| 3 A5 | A5 | A5 | MATCHING |
| 4 B5 | B5 | B5 | MATCHING |

CASSETTE INFORMATION — 2001 AUTO DETECT, 2002 PAPER INFORMATION, 2003 CONSISTENCY — CLOSE

FIG. 21

| NAME | GRAMMAGE | SIZE |
|---|---|---|
| PLAIN PAPER | 100g/m$^2$ | NOT SET |
| THIN PAPER | 70g/m$^2$ | NOT SET |
| A3 PLAIN PAPER | 100g/m$^2$ | A3 |
| A5 PLAIN PAPER | 100g/m$^2$ | A5 |

PRINTING APPARATUS THAT DISPLAYS SHEET INFORMATION OF SHEET TO NOTIFY A STATUS OF THE SHEET, AND STORAGE MEDIUM

BACKGROUND OF THE INVENTION

Field of the Invention

The present invention relates to a printing apparatus, a method of controlling the same, and a storage medium.

Description of the Related Art

In print on-demand (POD) systems, there is a need for paper to be managed in a centralized fashion by registering media information, which is information of paper used for printing (media), including the paper size. A user of this kind of system manages several hundred types of paper using management numbers and names. Meanwhile, registering by inputting a plurality of items of the media information for all of the types of paper is very cumbersome for users. For example, registering by inputting all of the attributes of the paper when registering media information of paper for which only the size is different to other paper is time-consuming, cumbersome work. Also, when every single type of paper that is only used temporarily is registered, a problem exists in that a large amount of media information ends up being registered, searching the media information requires time, and things become all the more inconvenient.

In general, many systems set an upper limit of the number of registerable types of paper to be several hundred, but in POD systems, there are cases in which the number of types of paper maintained exceeds this. In such environments, in cases where the upper limit on the number of paper types that can be registered is reached without having registered all of the paper types, it is necessary to delete media information that has already been registered.

One method for removing effort of registering paper types, found in Japanese Patent Laid-Open No. 2007-301911, is to arrange a Type 1 for registering a rough type of paper, and a Type 3 by which a detailed type of paper is registered. A three-type paper type database is kept for the Type 1, the Type 2 and a Type 3, which can be registered by changing attributes, based on information of the paper type registered for Type 1 and Type 3. A user can find base paper types from the Type 1 and the Type 3, copy them and create a Type 2 paper type, and can register the paper type by changing attribute values as necessary. Because of this, the effect of eliminating effort of inputting all of the attributes for each paper type is achieved.

However, with the above described conventional technique, the problems when there is a limit on the number of paper information items that can be registered cannot be solved, a separate effort of searching for base information of paper out of Type 3 information of which several thousands of types of paper may be registered ends up being necessary.

Also, when paper information including paper size is set for a cassette, there is the possibility that the size of the paper actually housed in the cassette and the size of the paper information set for the cassette are different.

SUMMARY OF THE INVENTION

An aspect of the present invention is to eliminate the above-mentioned problems which are found in the conventional technology.

A feature of the present invention is to provide a technique in which it is possible to notify a user when a size of a sheet of a sheet holding unit, and a size of a sheet of sheet information set for the sheet holding unit are mismatched.

Also, a feature of the present invention is to provide a technique in which the effort of registering paper information is simplified.

According to an aspect of the present invention, there is provided a printing apparatus comprising: a sheet holding unit having a detection unit for detecting a size of a sheet which is held, configured to hold a sheet; a storage unit configured to store sheet information including at least a size of a sheet as information representing a sheet; a setting unit configured to set first sheet information selected by a user in association with the sheet holding unit from a plurality of items of sheet information stored by the storage unit; and a notification unit configured to notify the user of a mismatch in a case where a size of a sheet that the first sheet information set by the setting unit indicates, and a size of a sheet detected by the detection unit are mismatched.

According to another aspect of the present invention, there is provided a method of controlling a printing apparatus having a sheet holding unit having a detection unit for detecting a size of a sheet which is held, configured to hold a sheet, and a storage unit configured to store sheet information including at least a size of a sheet as information representing a sheet, the method comprising: setting first sheet information selected by a user in association with the sheet holding unit from a plurality of items of sheet information stored in the storage unit; and notifying the user of a mismatch in a case where a size of a sheet that the first sheet information set in the setting indicates, and a size of a sheet detected by the detection unit are mismatched.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 depicts a view for showing an example of a screen displaying, on a console unit, paper information assigned to TRAY 1 in step S201 of FIG. 2.

FIG. 4 depicts a view for showing an example of a screen displayed on the console unit in step S204 of FIG. 2.

FIG. 5A and FIG. 5B depict views for showing examples of screens on which a paper database is displayed for cases where, in step S208 of FIG. 2, registering to the paper database and not registering to the paper database are selected respectively.

FIG. 7 depicts a view for showing an example of a screen for explaining a situation different to FIG. 4.

FIG. 8 depicts a view for showing an example of an alerting screen displayed when paper information having identical attribute values is registered.

FIG. 9A and FIG. 9B depict views for explaining examples in which an increase in the number of paper information items is held down by registering using "RES", which indicates inputting upon use.

FIGS. 17A-17E depict views for explaining examples of a screens, which are user mode screens displayed on the console unit in the MFP according to the second embodiment, for cases in which cassette paper size settings and paper type registration or setting is performed.

FIG. 20 depicts a view for showing an example of a screen for confirming consistency between paper sizes detected in the cassettes in the image forming apparatus according to the second embodiment and the paper sizes of paper information that a user set for the cassettes.

FIG. 21 depicts a view for illustrating a data configuration of paper information in a third embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
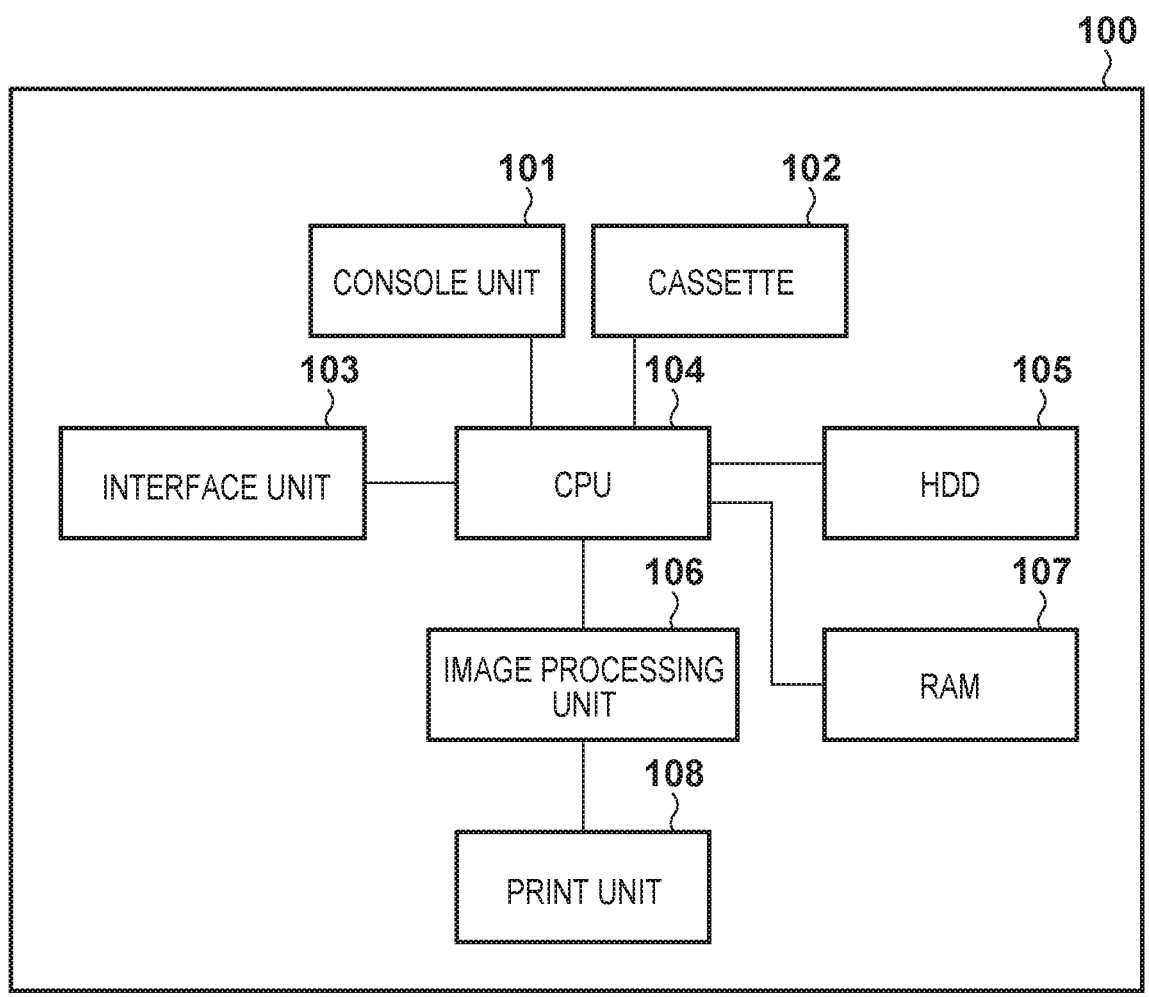
FIG. 1 is a block diagram for showing a configuration of an image forming apparatus according to an embodiment of the present invention.

FIG. 1 is a block diagram for showing a configuration of an image forming apparatus according to an embodiment of the present invention. Note, an image forming apparatus 100 is a printing apparatus such as a printer or a multi function peripheral (MFP), for example.

A console unit 101 is operated by a user, and is provided with a display device for displaying information necessary for the user to select a function, and an input unit such as buttons for instructing selection of functions, execution of printing, and the like. Note, the display device of the console unit 101 is provided with a touch panel function, and configuration may be taken such that by a user can perform selection of menus and input of various information by touching the buttons displayed on the display device. A RAM 107 is used for storing such things as various setting information such as parameters input from the console unit 101, information related to printing such as print information corresponding to a print unit 108, and generated print data. A CPU 104 references the content of the RAM 107, and rewriting is performed. Additionally, the RAM 107 is used as a buffer memory, and as a work memory necessary for performing image processing.

A cassette 102 is a tray unit for storing paper used for printing. The cassette 102 has one or more paper tray, and distinguishes the existence or absence of paper set in the paper trays, its amount or a type of the paper, and the CPU 104 stores this information in the RAM 107 as parameters. Also the user can change this information via the console unit 101.

An interface unit 103 connects a network, a scanner, a USB memory, or the like. The CPU 104 stores information input via the interface unit 103 into the RAM 107. Image data stored in the RAM 107, after having image processing applied to it by the image processing unit 106, is output to a print unit 108 and printed.

The CPU 104 reads out a control program stored in an HDD 105, loads the program into a RAM 107, and by executing the program loaded into the RAM 107, controls the operation of the image forming apparatus 100. An image processing unit 106 performs image processing in order that image data for printing stored in the RAM 107 be printable by the print unit 108. The print unit 108 is a printer engine for printing image data transferred from the image processing unit 106.

Figure 2:
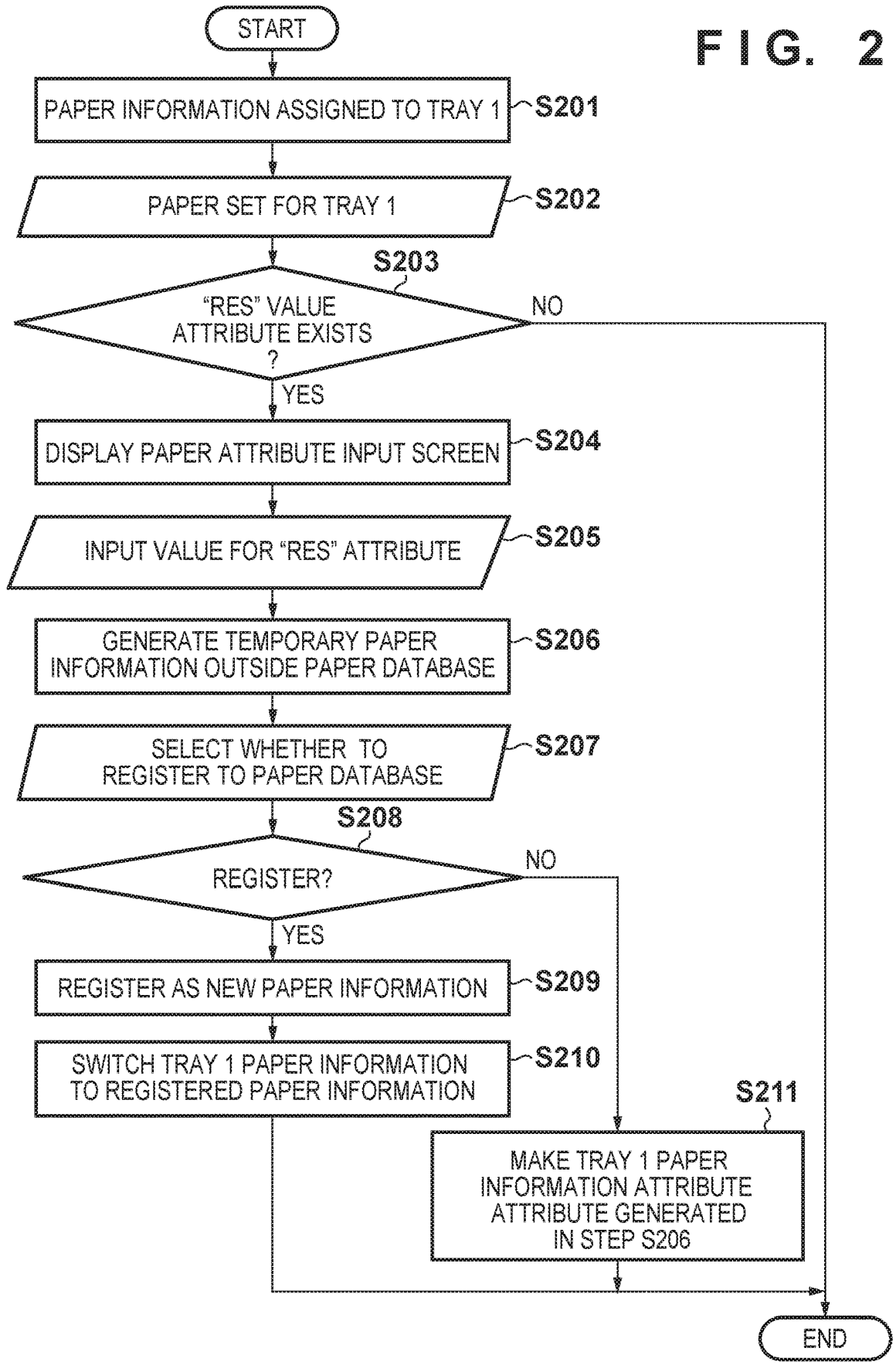
FIG. 2 is a flowchart for describing processing by the image forming apparatus according to the first embodiment.

FIG. 2 is a flowchart for describing processing by the image forming apparatus 100 according to the first embodiment. The processing illustrated in the flowchart is executed by a program that executes the processing being installed in the HDD 105, the CPU 104 reading the program out and loading it into the RAM 107, and the CPU 104 executing the program.

The processing shown in the flowchart is initiated by a user operating the console unit 101, and performing processing for registering paper information for one of the trays (sheet feed trays) of the cassette 102. Note, the cassette 102 has a tray having the name "TRAY 1".

Firstly, in step S201, the CPU 104 confirms that paper information is assigned for TRAY 1. Note, as a premise in such a case, it is necessary that some kind of paper information be registered for the image forming apparatus 100. Note, regarding the paper information, a user may register it by operating the console unit 101, or it may be registered in the image forming apparatus 100 from the start. The CPU 104 registers paper information confirmed to be assigned for TRAY 1 in step S201 to the HDD 105. Regarding the registration of the paper information, it will be explained later with reference to FIG. 3.

Next, the CPU 104 moves the processing to step S202, and confirms that the user set paper for TRAY 1 for which it was confirmed in step S201 that paper information is assigned. Note, when it is confirmed, in step S201, that the paper information is assigned for TRAY 1, in cases where the paper is already set for TRAY 1, the processing proceeds to step S203 (step S202 is executed). In step S203, the CPU 104 determines whether or not ("RES"), which indicates inputting upon use, is set for an attribute of the paper information confirmed in step S201. "RES" indicates selection in order that rather than inputting the value upon registration of the paper information to the paper database (existing in the HDD 105), the value be input when the paper is actually set for TRAY 1. Attributes of the paper information will be explained later with reference to FIG. 3. When, in step S203, it is determined that there is no attribute for which "RES" is set, the processing completes.

On the other hand, when the CPU 104, in step S203, determines that there is an attribute for which "RES" is set in the paper information of TRAY 1, the processing proceeds to step S204, and the CPU 104 displays, on the console unit 101, a screen for inputting values for attributes for which "RES" is set in step S203. Buttons for selecting whether or not to register to the paper database which a user selects are included on the screen, in step S207. The screen displayed in step S204 will be explained later with reference to FIG. 4.

Next, the processing proceeds to step S205, and the CPU 104 receives a value that the user input for an attribute for which "RES" is set on the screen displayed in step S204. Then, the processing proceeds to step S206, and the CPU 104 stores the paper information of TRAY 1 having the value input in step S205 into a region of the RAM 107 rather than the plain paper database in the HDD 105. The paper information is stored separately to the paper information assigned for TRAY 1 in step S201. The paper information assigned for TRAY 1 in step S201 is deleted from the RAM 107 when the user finalizes the paper information of TRAY 1. This temporary paper information may be maintained in the HDD 105, and it is maintained in a region different to the plain paper database in such a case as well, and it is deleted at the point in time when the assignment to TRAY 1 is removed.

Next, the processing proceeds to step S207, and the CPU 104 waits for the user to select, via the screen displayed on the console unit 101 in step S204, whether or not the temporary paper information of TRAY 1 created in step S206 is registered to the paper database of the HDD 105 similarly to the plain paper information of TRAY 1. In step S208, the CPU 104 moves the processing to step S209 when it determines that the user specified that it is registered, and the CPU 104 creates a duplicate of the paper information of TRAY 1 created in the RAM 107 in step S206 in the paper database in the HDD 105. Here, the paper information of TRAY 1 registered in the paper database of the HDD 105, unlike the paper information generated in the RAM 107 in step S206, is not deleted even if the assignment for TRAY 1 is deleted. Note, the paper information registered here is different to the paper information assigned for TRAY 1 in step S201, and even in a case where step S209 is executed, the paper information assigned in step S201 remains. In step S209, when the paper information is registered, the processing proceeds to step S210, the CPU 104 switches the paper information of TRAY 1 to the paper information registered in step S209, and the processing completes.

Meanwhile, when the CPU 104, in step S208, determines that the user selected that the paper information is not registered, it moves the processing to step S211. In step S211, the CPU 104, without generating the paper information in the paper database of the HDD 105, assigns the paper information generated in step S206 for TRAY 1, and the processing completes.

FIG. 3 depicts a view for showing an example of a screen displaying, on the console unit 101, paper information assigned for TRAY 1 in step S201 of FIG. 2.

Here, the name of the paper information is "Paper_Res" and attributes for the size, the grammage, the surface characteristics, special characteristics, color, and the like are held. Note, attributes that can be registered are not limited to those shown in FIG. 3, and there is no need for all of the attributes shown in FIG. 3 to be included. In FIG. 3, "RES", which indicates selection upon use, is set for size and grammage. In such a case, in step S203 of FIG. 2, it would be determined that there is an attribute for which "RES" is set, and the processing transitions to step S204.

FIG. 4 depicts a view for showing an example of a screen displayed on the console unit 101 in step S204 of FIG. 2.

In this screen, setting attributes or the name when it is determined that "RES", which indicates inputting upon use, is set in step S203 is possible. A setting button 401 is pressed to instruct a change of the name. Here, because the existence of paper information having identical names in the paper database is not allowed, in cases where registration to the paper database is selected in step S207, registration attaching a new name that does not exist is necessary. In step S207, in cases of temporary use where registration to the paper database in not selected, a change in the name is not necessary.

Setting buttons 402 and 403 are pressed to instruct input of a specific value for the paper size or the grammage for which "RES", which indicates inputting upon use, is set. A "use temporarily" button 404 is a button for selecting not registering the paper information into the paper database in step S207. A "newly register" button 405 is a button for selecting registration into the paper database. Note, configuration may be taken such that the "newly register" button 405 cannot be pressed until the name is changed with the setting button 401. Alternatively, configuration may be taken such that the "newly register" button 405 is displayed to be grayed out and that one cannot register in cases where the registration count of the paper database reaches an upper limit. Even in such a case, instructing the "use temporarily" button 404 is possible.

Note, in cases where there is an automatic paper size detection function provided with a tray of the cassette 102, configuration may be taken such that the paper size value is automatically updated with a value detected by the paper size detection function. In such a case, the setting button 402 shown in FIG. 4 is not displayed, and the size detected by the paper size detection function is displayed in the size column.

FIG. 5A and FIG. 5B depict views for showing examples of screens on which the paper database is displayed for cases where, in step S208 of FIG. 2, registering to the paper database, and not registering to the paper database, are selected respectively.

These screens can be displayed on the console unit 101 when the user operates the console unit 101.

FIG. 5A depicts a view for showing an example of a screen of the paper database in a case where it is determined that registration to the paper database is selected in step S208. FIG. 5A illustrates cases in which the name is set to "Paper" with the setting button 401 in FIG. 4, the size is set to "A4" with the setting button 402, and the grammage is set to "100 g/m$^2$" with the setting button 403, and new registration is instructed with the "newly register" button 405.

Also, FIG. 5B illustrates an example of a screen of the paper database in cases where not registering to the paper database is selected in step S207. This example illustrates cases in which the size is set to "A4" with the setting button 402, the grammage is set to "100 g/m$^2$" with the setting button 403 and the "use temporarily" button 404 is pressed. In FIG. 5B, because not registering to the paper database is selected, the paper information 501 indicating the name to be "Paper" is not registered as in FIG. 5A.

Figure 6A:
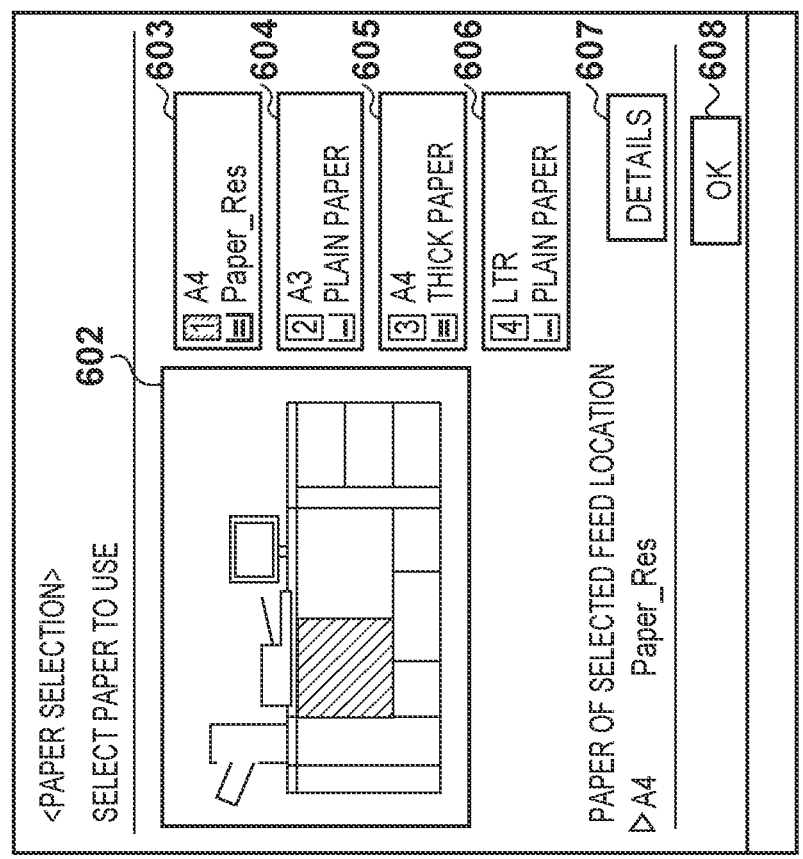
FIG. 6A and FIG. 6B depict views for showing examples of screens on which the paper information assignment states of each tray of a cassette is displayed for cases where, in step S207 of FIG. 2, registering to the paper database and not registering to the paper database are selected.
Figure 6B:
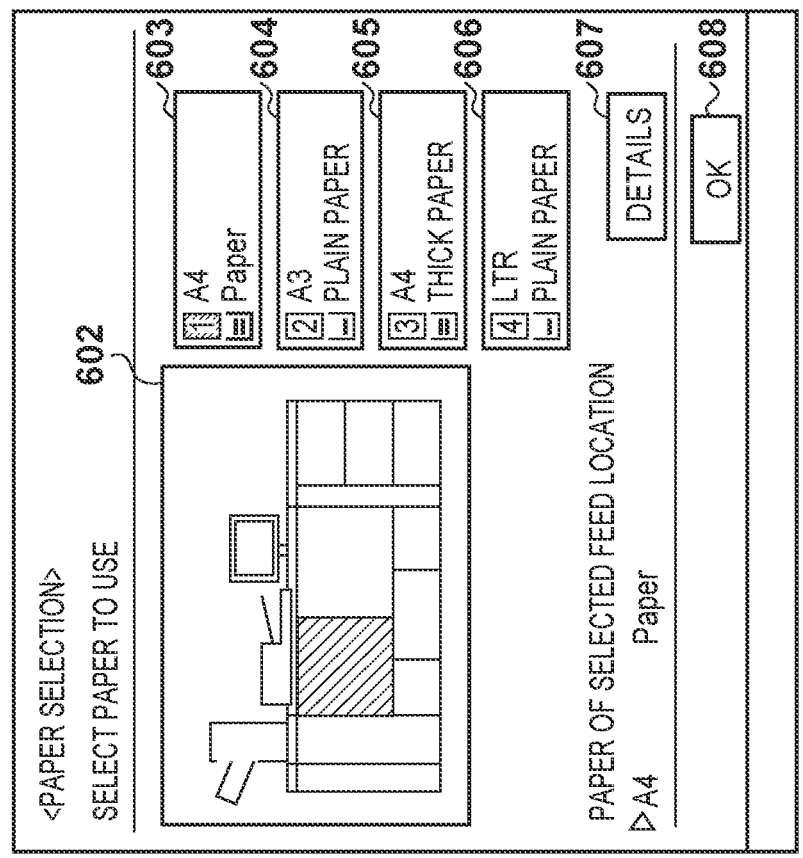

FIG. 6A and FIG. 6B depict views for showing examples of screens for displaying paper information assignment states for each tray of the cassette 102 in cases where registering and not registering to the paper database are selected in step S207 of FIG. 2. These screens are displayed on the console unit 101 when the user operates the console unit 101, and they are used as screens for performing the operation of step S201. Note, in FIG. 6A and FIG. 6B, cases of feed trays in which the first TRAY 1 is selected are shown.

FIG. 6A depicts a view illustrating an example of a screen indicating paper information assignment states of each tray for cases where, in step S207, the user selects registration to the paper database. Numeral 602 denotes an image of the image forming apparatus 100. Numerals 603-606 denote types of paper assigned for each tray. Here, the names of the trays are TRAY 1-TRAY 4.

In the processing of step S210 of FIG. 2, as illustrated in FIG. 5A, for the paper of TRAY 1, the paper having the name "Paper" is switched to and registered. For this reason, as illustrated in numeral 603 of FIG. 6A, the name of the type of the paper assigned for the first TRAY 1 is "Paper". By pressing a details button 607 by selecting TRAY 1, the type of the paper assigned for TRAY 1 can be changed, and detailed information of the paper can be confirmed. The OK button 608 is a button for confirming the settings of the screens.

FIG. 6B depicts a view illustrating an example of a screen for indicating the paper information assignment states of the trays in cases where, in step S207 of FIG. 2, the user selects not registering to the paper database. In FIG. 6B, portions that are common with FIG. 6A are shown with the same numerals. Here, because not registering the paper information shown in numeral 501 of FIG. 5A, for example, to the paper database is selected, for the paper of TRAY 1, the name of the paper type "Paper_Res" assigned in step S201 is displayed as is as illustrated in numeral 603. However, in step S211, using the attribute input in step S206, the paper information stored in the RAM 107 is switched. For this reason, after TRAY 1 is selected, the information displayed in cases where detailed information of the paper information of TRAY 1 is displayed by selecting the details button 607 includes the value input in step S205.

FIG. 7 depicts a view for showing an example of a screen for explaining a situation different to that of the previously described FIG. 4.

In FIG. 7, the value "RES", which indicates inputting upon use, is set for adjusting a color and an adjustment of the creep (shift) correction amount.

For these attributes, there exist those that the print unit 108 does not use, and those for which the print jobs for which they are used are limited. In the example of FIG. 7, the attribute of the color is not used by the print unit 108, but rather is an attribute used for the user to distinguish the paper. Adjustment of the creep (shift) correction amount is an attribute that the print unit 108 uses only in cases of jobs where creep correction is used. For such attributes, it is inconvenient to always request input of values in step S204 of FIG. 2. For this reason, in FIG. 7, even though the values of the two attributes for which "RES" is set are not specified, the remaining processing may be made to be possible.

The adjustment of the creep (shift) correction amount is a value that the print unit 108 uses in cases where a job for performing a creep correction is input. Accordingly, in cases where the "use temporarily" button 404 is pressed without inputting a value for a creep correction amount, when a job for which a creep correction is used is input, once again the inputting of the creep correction amount is prompted. Here, the example of the creep correction amount is given, but it is possible to adapt the example for attributes used by the print unit 108 according to the content of the job such as adjustment amounts of curl correction or an image position, or the number of tabs of the index sheet.

Note, even if in the paper information, other than the name, all of the attributes of the paper information is registered to be the same, from the perspective of the management of the paper information, there are use cases where such paper information is registered. However, if paper information having the same attributes increases, convenience will deteriorate. For this reason, in cases where paper information having identical attributes is registered, a warning message is displayed on the console unit 101.

FIG. 8 depicts a view for showing an example of an alerting screen displayed when paper information having identical attribute values is registered.

In the screen of FIG. 8, a message indicating that paper information having the same attributes is registered is displayed. Note, here, the name of the paper that is overlapping may be displayed in order that the paper information is distinguishable. An OK button 802 is a button for instructing the registration of the paper information to the paper database in spite of the overlapping, and when the OK button 802 is pressed, the paper information is registered. A cancel button 803 is a button for cancelling the registration of the paper information, and the registration of the paper information is not performed when the cancel button 803 is pressed.

In contrast to this, FIG. 9A and FIG. 9B explain examples in which an increase in the number of paper information items is held down by registering using "RES", which indicates inputting upon use.

FIG. 9A and FIG. 9B depict views for showing examples of displaying the paper database in cases where "RES", which indicates inputting upon use, is set for each attribute of the paper size, and cases where it is not.

In FIG. 9A, in cases where paper information for which only the paper size is different, and attributes other than the paper size attribute are the same exist, "RES" is set for the attribute corresponding to the paper size, and it is registered as a single paper information item. In such a case, the paper information can be treated as a single paper information item encompassing a plurality of sizes where the type of the paper is the same, and the grammage is 85 g/m$^2$ as with the name "Paper_Res" shown be numeral 902.

On the other hand, in FIG. 9B, the paper information of five types of paper, for which other than the paper size attributes are the same, is registered without using "RES". In such a case, as shown in numeral 903, paper information is necessary for all items having different paper sizes from each other. Because there is an upper limit to the number of paper information items that can be registered to the paper database, collective registration of paper information as illustrated in FIG. 9A is effective.

On the other hand, in order to strictly manage the paper information, operation in which paper information is generated and registered for each size, as in FIG. 9B, can be considered. In such a case, the paper information is generated by first setting "RES", which indicates inputting upon use, for the attribute of the paper size as in FIG. 9A. Then, simply by inputting the size and the name by performing the processing of FIG. 2, the paper information can be generated for each size, as in FIG. 9B.

The following methods for specifying the paper to be used when a print job is input into the image forming apparatus 100 through a network connected to the interface unit 103, or the like. One is a method of specifying the name of the paper, another one is a method of specifying an ID assigned to the paper, and another is a method of specifying attribute values of the paper. The previously described cases in which paper information having an attribute for which "RES", which indicates inputting upon use, is set is specified with a name or a paper ID, the inputting of the values indicating such attributes is necessary.

Figure 10:
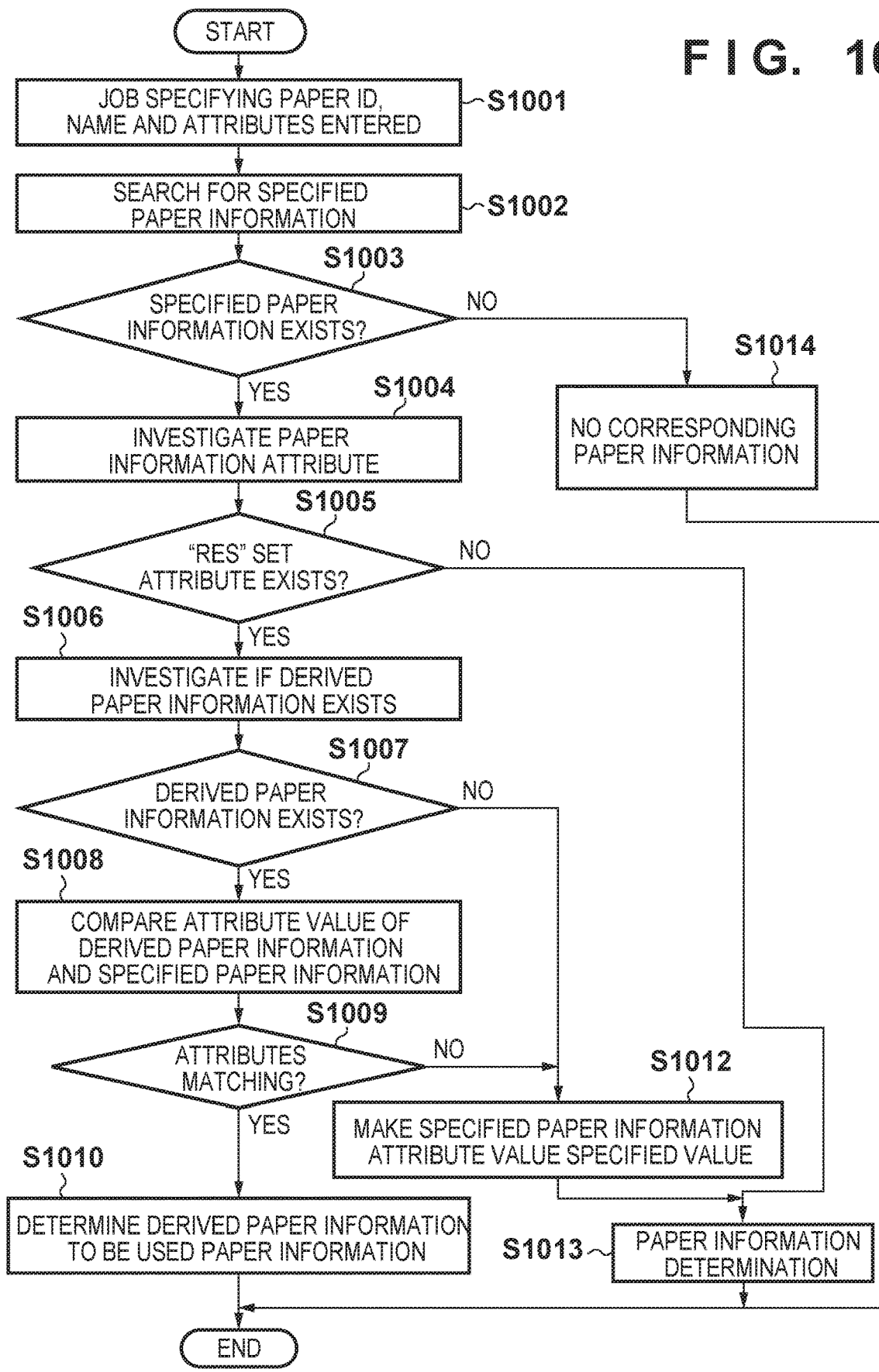
FIG. 10 is a flowchart for describing processing for generating paper information in accordance with an input print job in the image forming apparatus according to the first embodiment.

FIG. 10 is a flowchart for describing processing for generating paper information in accordance with an input print job in the image forming apparatus 100 according to the first embodiment. Note, the processing illustrated in the flowchart is executed by a program that executes the processing being installed in the HDD 105, loaded into the RAM 107 upon execution, and executed under the control of the CPU 104.

The processing is initiated by a print job being received through the interface unit 103. Firstly, in step S1001, information of the paper used in the print job specified by the name or the paper ID of the paper for an input print job is acquired. With this, the processing proceeds to step S1002, and the CPU 104 searches the paper database of the HDD 105 for the paper information specified by the print job. When, in step S1003, the CPU 104 determines that the paper information specified by the print job is not in the paper database, the processing proceeds to step S1014, and the CPU 104 determines that there is no corresponding paper. The processing completes.

Meanwhile, when the CPU 104, in step S1003, determines that the paper information corresponding to the specified paper is in the paper database, the processing proceeds to step S1004, and the CPU 104 investigates the value set for the attribute of the paper information of the paper database. Next, the processing proceeds to step S1005, and the CPU 104 determines whether or not there is an attribute for which "RES", which indicates inputting upon use, is set. Here, when it is determined that there is no attribute for which "RES" is set, the processing proceeds to step S1013, the paper information found in step S1002 is finalized, and the processing completes.

On the other hand, when, in step S1005, it is determined that there is an attribute for which "RES" is set, the processing proceeds to step S1006, and the CPU 104 investigates whether or not there is paper information generated by deriving from the paper information. Here, the paper information generated by deriving is paper information generated based on the paper information assigned in step S201, in step S206 of FIG. 2. Because the paper information generated by deriving here is paper information stored in the RAM 107, rewriting the specific paper size, or the like, of the attribute for which "RES" is set in step S205, a specific value is set for all of the attributes of the paper information generated by deriving.

When, in step S1007, the CPU 104 determines that there is no paper information generated by deriving, it moves the processing to step S1012. In step S1012, the CPU 104 generates paper information for which specified attribute values are assigned for specified paper information attributes for which "RES" is set of the paper database, and the processing proceeds to step S1013. In step S1013, the CPU 104 determines this paper information to be the paper information to be used in the print job, the processing completes.

Meanwhile, when, in step S1007, the CPU 104 determines that there is paper information generated by deriving, the processing proceeds to step S1008, and the CPU 104 compares an attribute value of the paper information generated by deriving, and an attribute value specified by the print job. When, in step S1009, the CPU 104 determines that the attribute value of the paper information generated by deriving and the attribute value specified by the print job are matching, the CPU 104 moves the processing to step S1010. In step S1010, the CPU 104 determines the paper information generated by deriving to be the paper information to be used by the print job, and the processing completes.

Meanwhile, when, in step S1009, the CPU 104 determines that the values of the attributes do not match, the CPU 104 moves the processing to step S1012. In step S1012, the CPU 104 generates paper information for which specified attribute values are assigned for specified paper information attributes for which "RES" is set of the paper database, and the processing proceeds to step S1013. In step S1013, the CPU 104 determines this paper information to be the paper information to be used by the print job, the processing completes.

Next, explanation will be given providing concrete examples using FIG. 9A and FIG. 9B.

In step S1001 of FIG. 10, cases are considered in which the input print job is specifying for the paper information that the name is "Paper_Res" and the paper size is A4. In such a case, paper information for which the name is "Paper_Res" in the paper database exists. Because this paper information has an attribute for which "RES" is set, it is determined whether or not there is paper information derived from the name "Paper_Res" in step S1006 and in step S1007. If there is no derived paper information, the processing transitions from step S1007 to step S1012. In step S1012, the CPU 104 generates paper information "Paper_Res" for which the paper size is A4 in the RAM 107, and, in step S1013, determines the paper information to be the paper information to be used by the print job.

Meanwhile, the paper information shown in FIG. 9B is paper information generated by deriving from the paper information having the name "Paper_Res". In such a case, the processing transitions from step S1007 to step S1008. In such a case, paper information having the paper size "A4" exists ("Paper_A4"), the processing transitions from step S1009 to step S1010, and the CPU 104 determines the paper information "Paper_A4" to be the paper information to be used by the print job.

By the first embodiment, as explained above, configuration is taken so that paper information can be registered in a state in which information (for example "RES") indicating inputting upon use is set for paper information attributes such as the paper size, the paper type, and the grammage. Cases in which paper information, for which this information (RES) is set for the paper size, for example, which is an attribute of the paper information, is set to a sheet feed tray are considered. If the sheet feed tray is provided with a paper size auto-detect mechanism for the paper actually set in the sheet feed tray, the paper size of the paper information can be automatically set to a paper size that is detected by the auto-detect mechanism. Because of this, the effort of a user inputting attributes such as the paper size can be reduced.

Also, by using a value indicating inputting upon use upon the registration of the paper information, paper information that is different to other paper information by only some attribute (for example, the paper size) can be registered as a single paper information item (FIG. 9B). Because of this, the number of paper information items registered can be reduced.

Also, when there is paper information registered by setting information indicating inputting upon use for an attribute of the paper information, the value that the user actually uses is set for that information. Because of this, information indicating inputting upon use can be registered as the paper information for which the value is actually finalized.

Also, in cases where the values of the attributes of the paper information specified in the print job include information indicating inputting upon use, paper information including attributes matching attributes specified by the print job from out of the paper information generated by deriving from the paper information specified by the print job is searched. Also, the paper information, having been found, can be determined to be the paper information to be used by the print job.

Because by the first embodiment an attribute of registered paper information can be set by inputting when the paper of the paper information is used for printing, paper information for which only a few attributes have multiple differing types can be registered as a single paper information item. Because of this, the number of paper information items that are registered is reduced, and management of paper information can be performed easily.

Also, with attributes input when used for printing, new paper information can be registered by rewriting an attribute of the paper information registered with an attribute input upon use. Because of this, there is the effect that the effort of paper information registration can be simplified because new paper information can be registered by inputting the attribute that is set only when inputting upon use.

Second Embodiment

Figure 11:
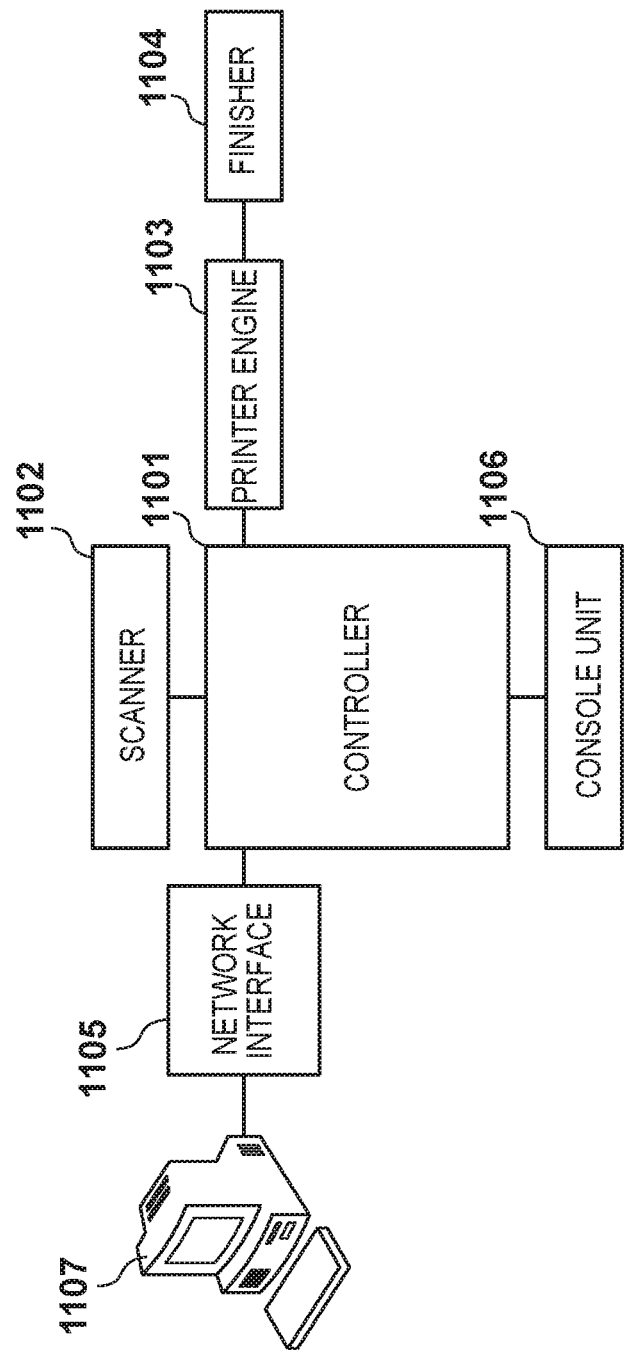
FIG. 11 depicts a view for showing a configuration of a multi function peripheral (MFP) which is an example of the image forming apparatus according to the second embodiment of the present invention and a configuration of a system including the image forming apparatus.

FIG. 11 depicts a view for showing a configuration of a multi function peripheral (MFP) which is an example of the image forming apparatus according to the second embodiment of the present invention and a configuration of a system including this MFP.

Figure 12:
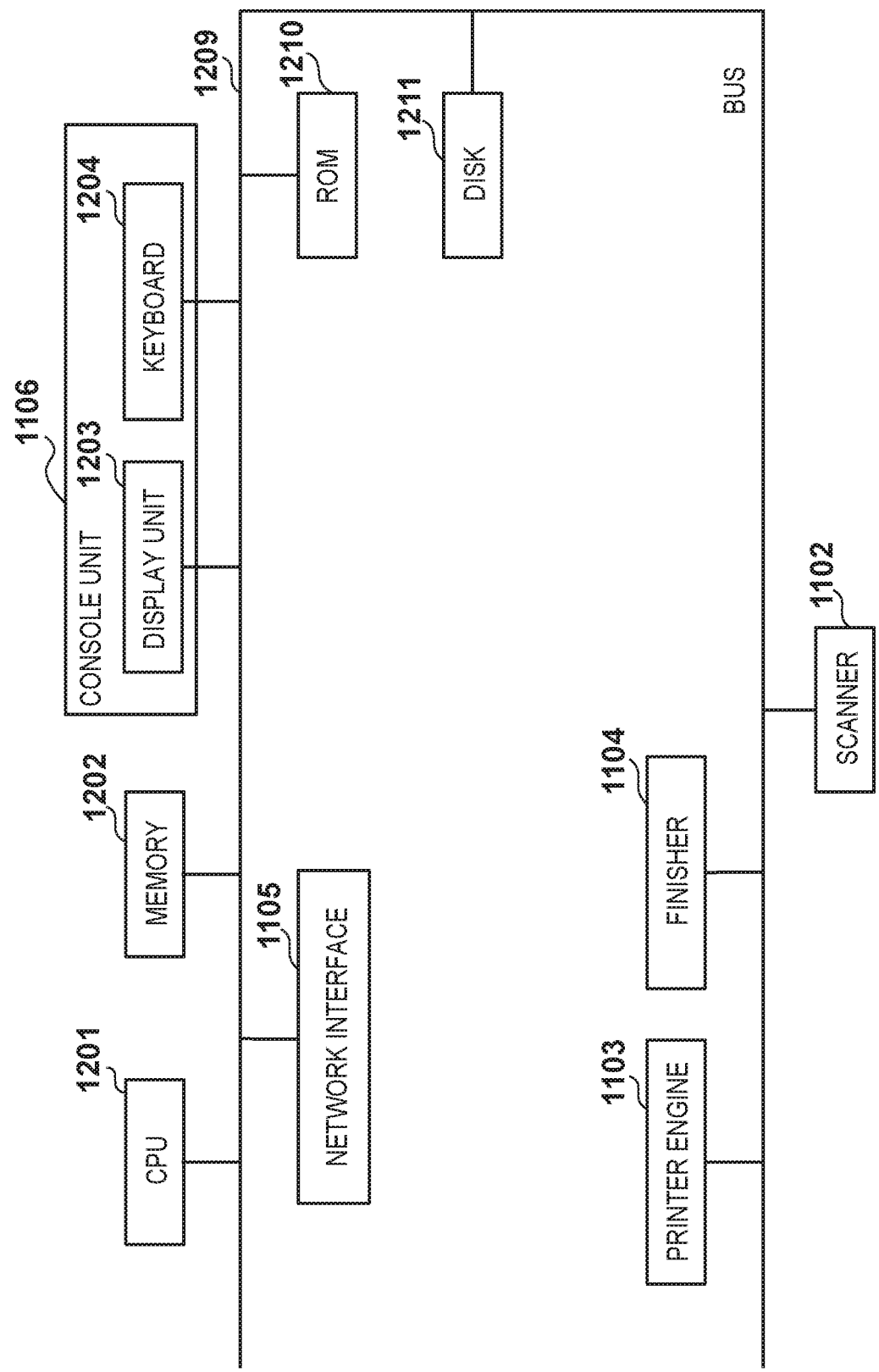
FIG. 12 is a block diagram for showing a hardware configuration of a controller, and connected peripherals, according to the second embodiment.

A controller 1101 controls the multi function peripheral, and has a hardware configuration shown in FIG. 12. A scanner 1102 is controlled by the controller 1101, and generates image signals corresponding to an image of an original by scanning the original. A printer engine 1103 is controlled by the controller 1101, and prints an image onto a sheet in accordance with image data supplied from the controller 1101. The printer engine 1103 is connected to a finisher 1104, and the finisher 1104 executes post-processing such as stapling processing, for example, on a plurality of pieces of paper output from the printer engine 1103. The finisher 1104 is controlled by the controller 1101. A network interface 1105 provides bidirectional communication with a network to the controller 1101, and is connected to a personal computer 1107 via the network. A console unit 1106 has a display unit and a keyboard, and along with displaying information from the controller 1101, it transmits instructions from the user input via the console unit 1106 to the controller 1101. Note, the display unit is provided with a touch panel function, receives operation from the user via a screen of the display unit, and transmits them to the controller 1101.

FIG. 12 is a block diagram for showing a hardware configuration of the controller 1101, and connected peripherals, according to the second embodiment. Note, portions that are common with FIG. 11 are shown with the same numerals in FIG. 12.

Within the controller 1101, the CPU 1201, via a bus 1209, is connected to a memory 1202, a console unit 1106 comprising a display unit 1203 and a keyboard 1204, a ROM 1210, and a disk 1211. Various programs that the CPU 1201 executes and data are stored in the disk 1211 (storage medium) which may be a hard disk drive or a floppy disk, are read out sequentially as necessary from the memory 1202, and executed under the control of the CPU 1201. The disk 1211 may be built into the MFP or may be removable from the MFP. Furthermore, the programs may be downloaded from another MFP, a server, or the like, via a network, and stored in the disk 1211. Also, the memory 1202 may have both such functions of a volatile memory such as a DRAM and a non-volatile memory such as an SRAM, or the memory 1202 may be a volatile memory and the disk 1211 a non-volatile memory.

The CPU 1201 performs display by writing data to the display unit 1203, and instructions are input from the user by the CPU 1201 receiving data from the display unit 1203 which is a touch panel, or the keyboard 1204. The input information is transferred to either the memory 1202 or the disk 1211 and stored, and is used for various processing. Also, the network interface 1105 is connected to the bus 1209. Furthermore, the printer engine 1103, the finisher 1104, and the scanner 1102 are connected to the bus 1209.

The image data is input from the scanner 1102 or the network interface 1105, and stored in the memory 1202 or the disk 1211 of the controller 1101. Also, it also is possible that image data be stored in removable memory beforehand, and that the image data can be taken by mounting the memory to the controller 1101. Movement or copying of the image data stored in the disk 1211 to the memory 1202 becomes possible, and it is possible to compose various additional images (for example, page numbers) to the image data on the memory according to the content instructed from the console unit 1106. Note, the printer engine 1103, the finisher 1104 and the scanner 1102 may not be inside of the MFP, but rather each may exist as an individual peripheral device on a network, and the controller 1101 of the MFP may control them.

Figure 13:
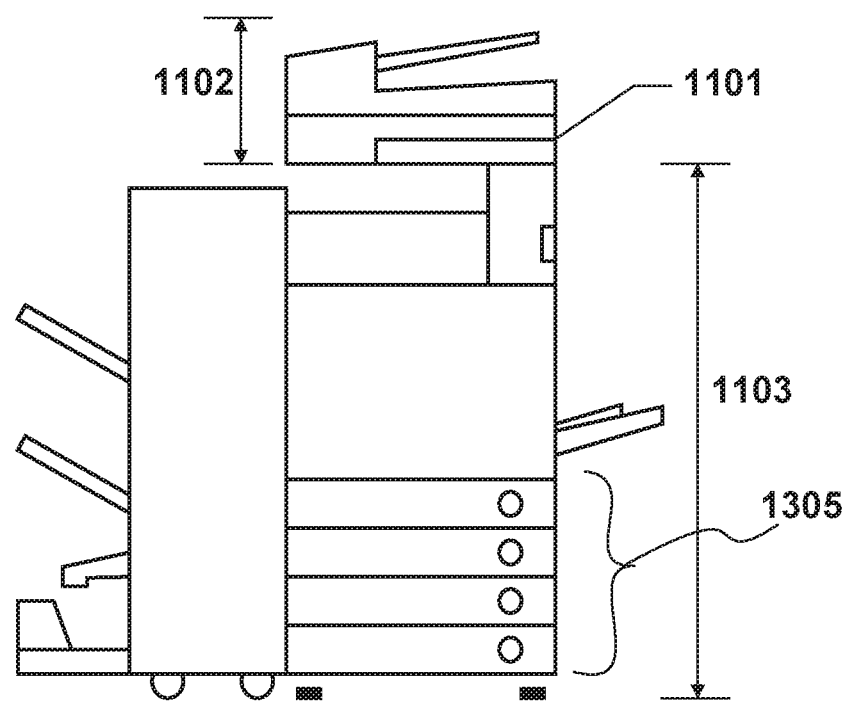
FIG. 13 depicts an outline view of the image forming apparatus according to the second embodiment.

FIG. 13 depicts an outline view of the image forming apparatus (MFP) according to the second embodiment.

The scanner 1102, which is an image input device, by illuminating an image on a paper original and scanning the original with a CCD line sensor, converts the image of the original placed on the scanner 1102 into electronic image data. With the image data thus electronically converted, such things as a color determination, a size determination, and the like, of the original are performed.

The printer engine 1103, which is an image output device, prints the image data on the paper, performs post-processing such as stapling and binding on the paper, and outputs it. Activation and stopping of the print operation are performed by instruction from the CPU 1201 of the controller 1101.

Feed cassettes 1305 houses paper used for printing, and is comprised of a single cassette or of a plurality of cassettes. It is possible to pull out each cassette, and in cases where one wishes to change the paper housed in a cassette, the paper can be changed by pulling out that cassette, removing the paper, setting the paper that one wishes to change, and returning the cassette.

Figures 15, 16:
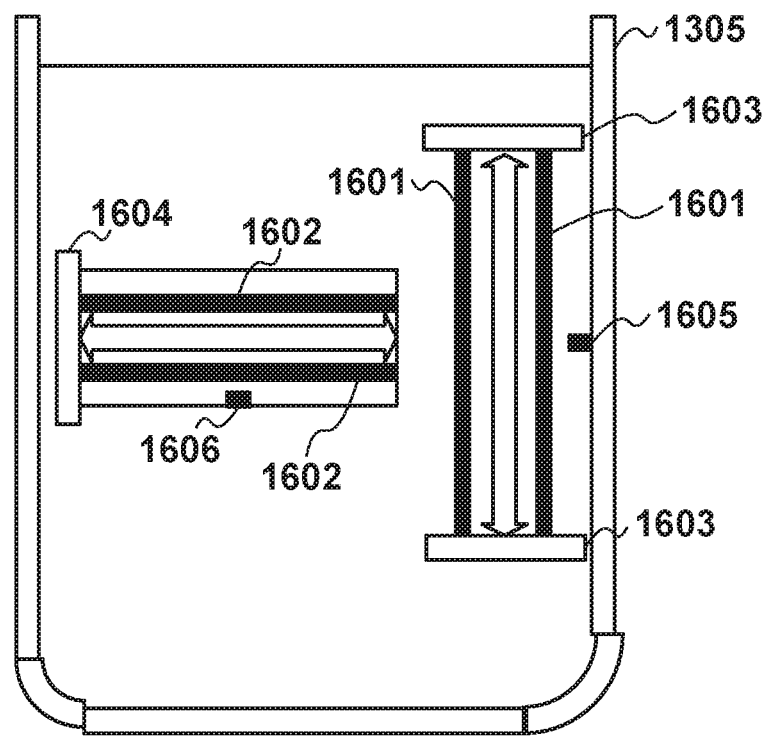
FIG. 15 depicts a view for showing an example of paper information stored in a cassette of the image forming apparatus according to the second embodiment.
FIG. 16 depicts a view for explaining a mechanism for automatically detecting the size of the paper set (housed) in the cassette of the image forming apparatus according to the second embodiment.

The information of the paper stored in the cassette is stored in a data configuration as shown in FIG. 15. The information of the paper is stored in the memory 1202 or the disk 1211.

Figure 14:
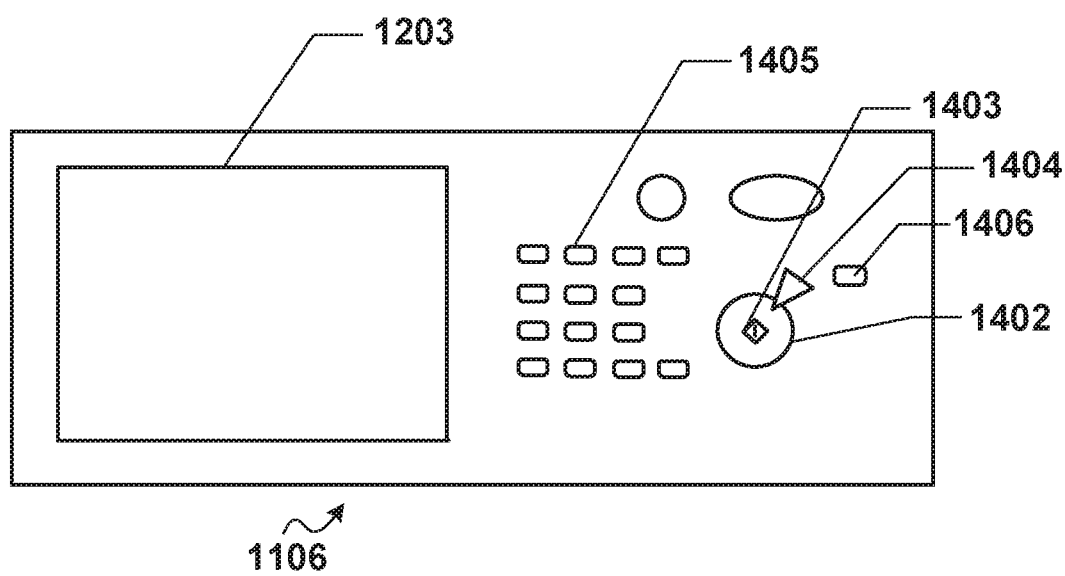
FIG. 14 depicts a top view a console unit of the image forming apparatus according to the second embodiment.

FIG. 14 depicts a top view of the console unit 1106 of the image forming apparatus according to the second embodiment.

The display unit 1203 has a touch panel sheet affixed on a liquid crystal display, for example, and as well as displaying operation screens and softkeys, it transmits position information to the CPU 1201 when displayed keys are pressed. A start key 1402 is used in cases where initiation of read operations of an original image, and the like, is instructed. In a center part of the start key 1402 is arranged a dual color LED 1403, having both green and red colors, which indicates whether or not the current state is such that the start key 1402 can be used is made, depending on the light emission color of the LED 1403. A stop key 1404 is made to have the operation of stopping an operating operation. A numeric keypad 1405 is comprised of a group of numeral and character buttons, and is used for instructing a setting of a number of copies or a switching of screens of the display unit 1203. A user mode key 1406 is pressed in cases where device setting is performed. Note, the keyboard 1204 of FIG. 12 corresponds to the hard keys 1402-1406 shown in FIG. 14.

FIG. 16 depicts a view for explaining a mechanism for automatically detecting the size of the paper set (housed) in the cassette of the image forming apparatus according to the second embodiment.

This Figure is a view in which the cassettes 1305 is seen from above. On the cassettes 1305, guides 1603 and 1604, which can move freely on the rails 1601 and 1602, are arranged, and adjustment can be made of the positions of these rails so as to match the size of the paper to be set. Sensors 1605 and 1606 detect at what positions the guides 1603 and 1604 are on the rails 1601 and 1602. It is possible to automatically detect the size of the paper set in the cassettes 1305 by the sensors 1605 and 1606.

FIGS. 17A-17E depict views for explaining examples of screens, which are user mode screens displayed on the console unit 1106 in the MFP according to the second embodiment, for cases in which cassette paper size settings and paper type registration or setting is performed.

Figure 17A:
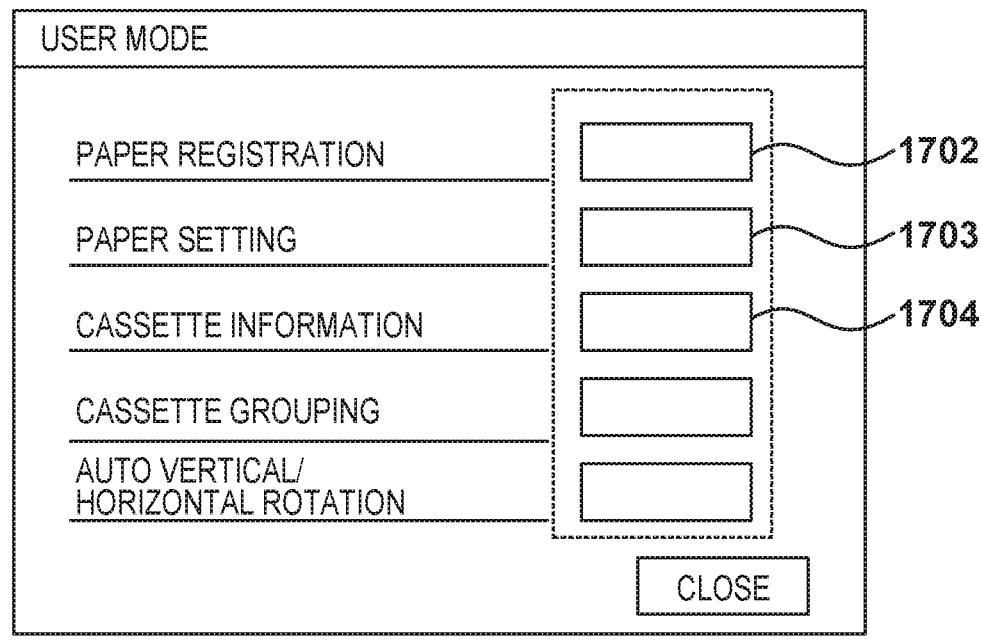

When the user presses the user mode key 1406 of the console unit 1106, a user mode screen shown in FIG. 17A is displayed. From this screen registration and setting of the paper size can be performed.

First of all, explanation will be given for a method of paper information registration.

Figure 17B:
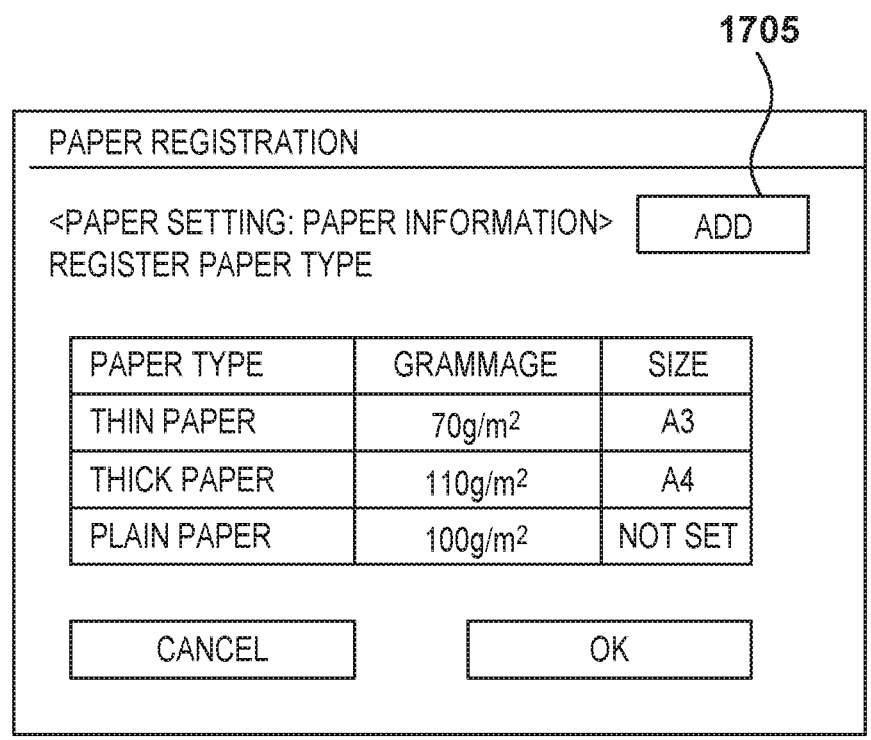

When the user presses a "paper registration" button 1702 on the screen of FIG. 17A, the paper information registered screen shown in FIG. 17B is displayed. In the screen of FIG. 17B, registered paper information is displayed. Here, "thin paper", "thick paper" and "plain paper" are registered as paper types, and the grammages have the sizes 70 g/m$^2$, 110 g/m$^2$, and 100 g/m$^2$ respectively. Also, the paper sizes are A3, A4 and "not set" respectively. In this way, for each of the sizes set for the paper information, there exist those for which a size is set, and those for which a size is not set ("not set").

When a paper information add button 1705 is pressed, the paper information add screen shown in FIG. 17C is displayed. Here, by pressing a button corresponding to the item that a user wishes to change from out of a paper information change button group 1706, the user can change the paper type, the grammage, and the size, and by pressing an OK button 1707, paper information for which the attribute is changed is registered.

Next, explanation will be given a paper information setting method.

When a "paper setting" button 1703 on the screen of FIG. 17A is pressed a paper setting screen shown in FIG. 17D is displayed.

A cassette selection button group 1708 is arranged on the paper setting screen, and paper sizes of the cassettes auto-detected by the sensors 1605 and 1606 explained with FIG. 16 are displayed. When a user selects one of the cassettes from a cassette selection button group 1708 and presses a setting button 1709, the paper information setting screen shown in FIG. 17E is displayed.

For the paper information setting screen of FIG. 17E, a list of paper information items explained with FIG. 17B is displayed. Here, for example, the setting of the paper information for the highest level cassette (CASSETTE 1) of the cassettes 1305 is selected in FIG. 17D. When paper information 1710 is selected on the screen of FIG. 17E, the paper information where the paper type of the paper information is "thin paper", and the paper size is "A4" is set for CASSETTE 1.

With this, the paper information of "CASSETTE 1" shown in FIG. 15 is changed to "thin paper", "70 g/m$^2$" and "A3", and a detection mode column of CASSETTE 1 is set to "manual".

Meanwhile, in cases where paper information 1711, for which the paper size is not set, is selected, the paper size auto-detected by the sensors 1605 and 1606 explained with FIG. 16 is set. In such a case, the paper information of "CASSETTE 1" shown in FIG. 15 is "plain paper", "100 g/m$^2$", "A4" as illustrated in FIG. 15, and the detection mode is "auto".

For example, when the paper information is assigned for each cassette as illustrated in FIG. 15, a print job specifying a cassette selection is "auto" and the paper size "A3" is input. In such a case, CASSETTE 2 in which plain paper of the paper size "A3" is housed is selected, paper is fed from CASSETTE 2, and printing is performed.

Figure 18:
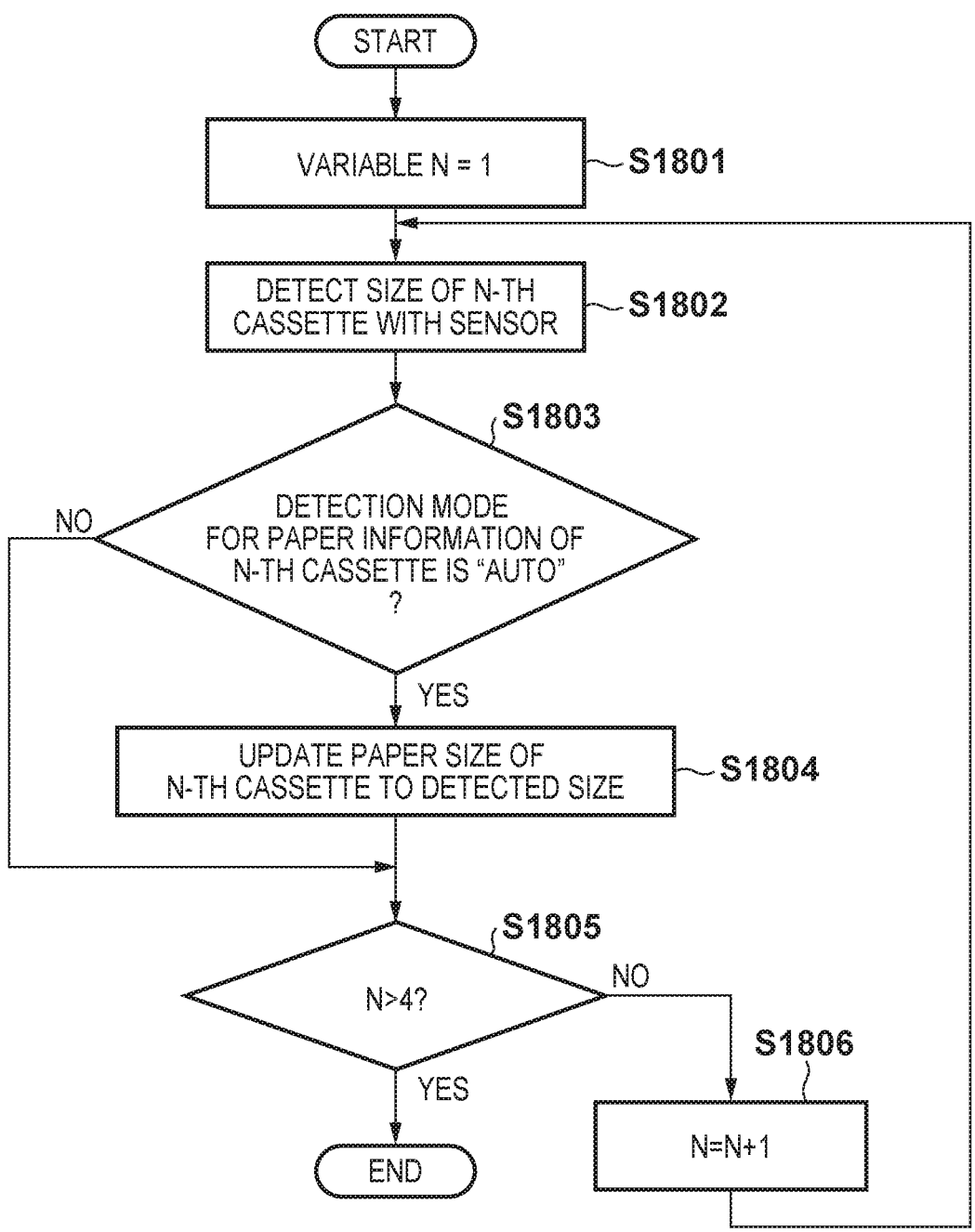
FIG. 18 is a flowchart for describing processing executed in a case where a user closes the cassettes having set paper into the cassettes, or where a user moves guides of a cassette in the image forming apparatus according to the second embodiment.

FIG. 18 is a flowchart for describing processing executed in a case where a user closes the cassettes 1305 having set paper into the cassettes, or where a user moves the guides 1603 and 1604 of a cassette in the image forming apparatus according to the second embodiment. Note, the processing illustrated in the flowchart is executed by a program that executes the processing being installed in the disk 1211, loaded into the memory 1202 upon execution, and executed under the control of the CPU 1201.

Firstly, in step S1801, the CPU 1201 sets a variable N stored in the memory 1202 to "1". Next, the processing proceeds to step S1802, and the CPU 1201 detects, with the sensors 1605 and 1606 arranged on the cassette, the size of the paper housed in an N-th sheet feed tray (the first is CASSETTE 1) of the cassettes 1305. Next, the processing proceeds to step S1803, and it is determined whether or not the detection mode column of the paper information of the N-th cassette is "auto", referencing the paper information shown in FIG. 15. When it is determined that it is "auto", the processing proceeds to step S1804, and the size of the paper information of the cassette corresponding to FIG. 15 is updated with a size detected by the sensors 1605 and 1606 in step S1802. Next, the processing proceeds to step S1805, and because here the cassettes 1305 comprise four levels of cassettes, it is determined whether the processing has completed up to the fourth cassette. When the processing has not completed up to the fourth cassette, the processing proceeds to step S1806, the value of the variable N is incremented by one, and the processing returns to step S1802.

Meanwhile, when the detection mode column of the paper information of the N-th cassette is not "auto" in step S1803, step S1804 is skipped and the processing proceeds to step S1805.

Figure 19:
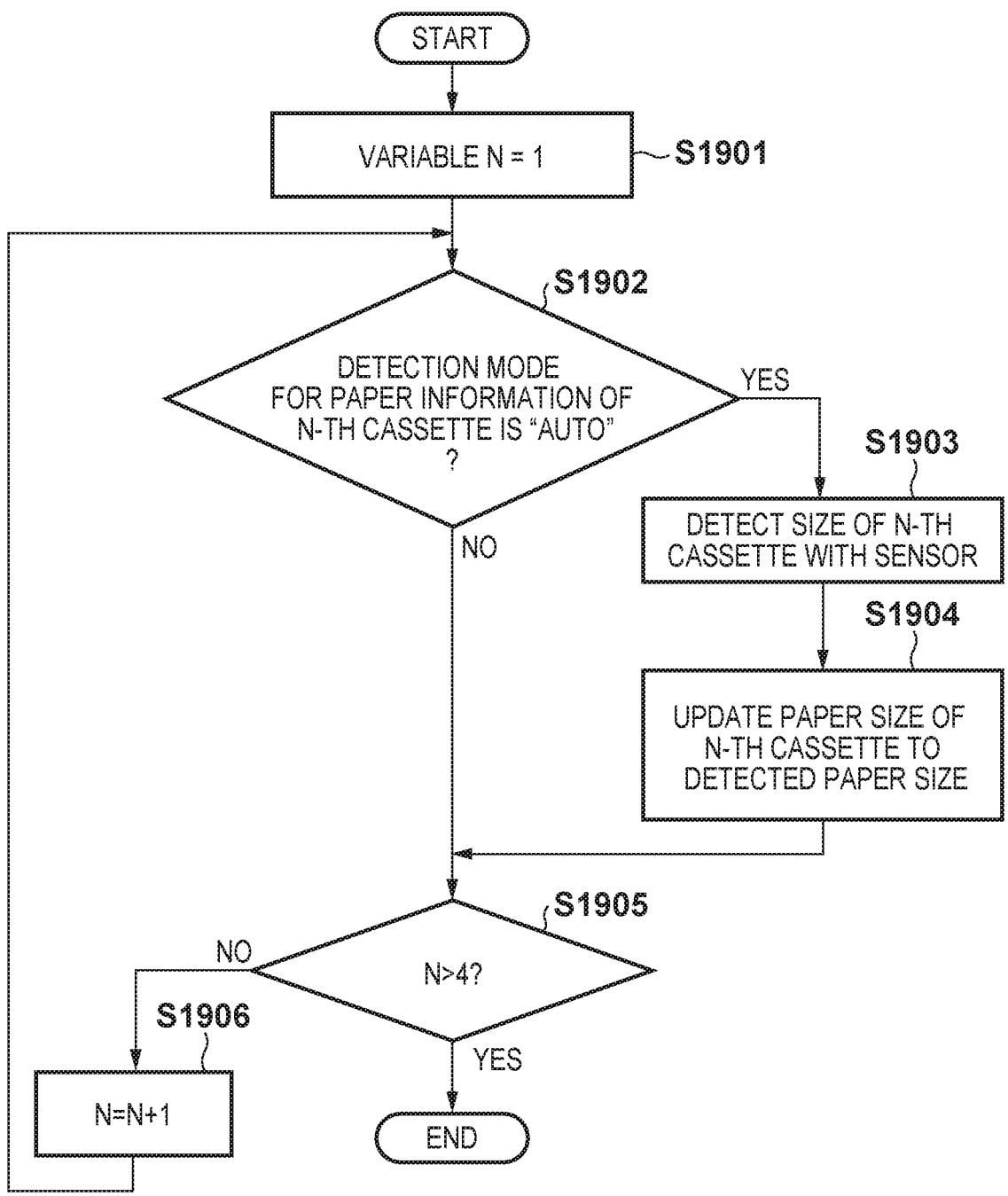
FIG. 19 is a flowchart for describing other processing executed in a case where a user closes the cassettes having set paper into the cassettes, or where a user moves guides of a cassette in the image forming apparatus according to the second embodiment.

FIG. 19 is a flowchart for describing other processing executed in a case where a user closes the cassettes 1305 having set paper into the cassettes, or where a user moves the guides 1603 and 1604 of a cassette in the image forming apparatus according to the second embodiment. Note, the processing illustrated in the flowchart is executed by a program that executes the processing being installed in the disk 1211, loaded into the memory 1202 upon execution, and executed under the control of the CPU 1201.

The difference between FIG. 19 and FIG. 18 is that after the paper size is detected by the sensors 1605 and 1606 in step S1801, it is determined whether or not the detection mode of the paper information of the cassette is "auto" in FIG. 18. In contrast to this, in FIG. 19, first it is determined whether or not the detection mode of the paper information of the cassette is "auto", and only in cases where it is "auto" is the paper size detected by the sensors 1605 and 1606.

Firstly, in step S1901, the CPU 1201 sets the variable N stored in the memory 1202 to "1". Next, the processing proceeds to step S1902, and the CPU 1201 determines whether or not the detection mode column of the paper information of the N-th cassette is "auto" referencing the paper information shown in FIG. 15. When, in step S1902, it is determined that it is "auto", the processing proceeds to step S1903, and the size of the paper housed in the N-th sheet feed tray of the cassettes 1305 (the first one is CASSETTE 1) is detected by the sensors 1605 and 1606 arranged in the cassette. Next, the processing proceeds to step S1904, and the CPU 1201 updates the size of the paper information of the N-th cassette corresponding to FIG. 15 with the size detected by the sensors 1605 and 1606 in step S1903. Then, the processing proceeds to step S1905, and because the cassettes 1305 comprise fourth levels of cassettes, it is determined whether the processing up to the fourth cassette has completed. When the processing has not completed up to the fourth cassette, the processing proceeds to step S1906, the value of the variable N is incremented by one, and the processing returns to step S1902. Meanwhile, when the detection mode column of the paper information of the N-th cassette is not "auto" in step S1902, the processing proceeds to step S1905.

In this way, by the second embodiment, it is possible to update the paper size of the paper information that is set for the cassette automatically by using the size of the paper actually housed in the cassette by setting the detection mode of the paper information that is set in the cassette to "auto". Note, explanation was given for cases in which the sensors 1605 and 1606 detect the size of the paper, but it is possible to update the type or the grammage of the paper information with the type or the grammage of the paper actually housed in the cassette if a sensor, that can detect characteristics of the surface of the paper, the grammage of the paper, or the like, is arranged in the cassette, for example.

FIG. 20 depicts a view for showing an example of a screen for confirming consistency between paper sizes detected in the cassettes in the image forming apparatus according to the second embodiment and the paper sizes of paper information that a user set for the cassettes.

When the user mode key 1406 of the console unit 1106 is pressed, the screen shown in FIG. 17A is displayed, and by the "cassette information" button 1704 being pressed on the screen of FIG. 17A, this screen is displayed. Note, the information of the screen is generated based on the data of the paper information of FIG. 15.

In auto-detect 2001, the paper sizes detected by the sensors 1605 and 1606 of each of the cassettes is displayed. Also, in the paper information 2002, the paper sizes set in the paper information shown in FIG. 15, for example, are displayed. In consistency 2003, the consistency between detected paper sizes, and the paper sizes set in the paper information is displayed. In other words, the paper sizes of both auto-detect 2001 and the paper information 2002 are set, and when auto-detect 2001 and the paper size of the paper information 2002 are different to each other "mismatch" is displayed, and when that is not the case "match" is displayed.

By the above, the user can easily know whether a paper size auto-detected by the cassette is being used or whether a paper size set manually is being used, and convenience is dramatically improved.

Third Embodiment

Next, a third embodiment, which is a variation of the second embodiment of the present invention, will be explained. Note, because the configuration of the image forming apparatus according to the third embodiment is similar to that of the previously described second embodiment, explanation is omitted.

FIG. 21 depicts a view for illustrating a data configuration of paper information (sheet information) in a third embodiment.

In FIG. 21, the paper information includes the name, the grammage, and the size of the paper, but it may include other information also. By setting this paper information for a paper feed cassette (sheet feeding unit), the image forming apparatus is able to identify the type of paper that the paper feed cassette stores.

Figure 22A:
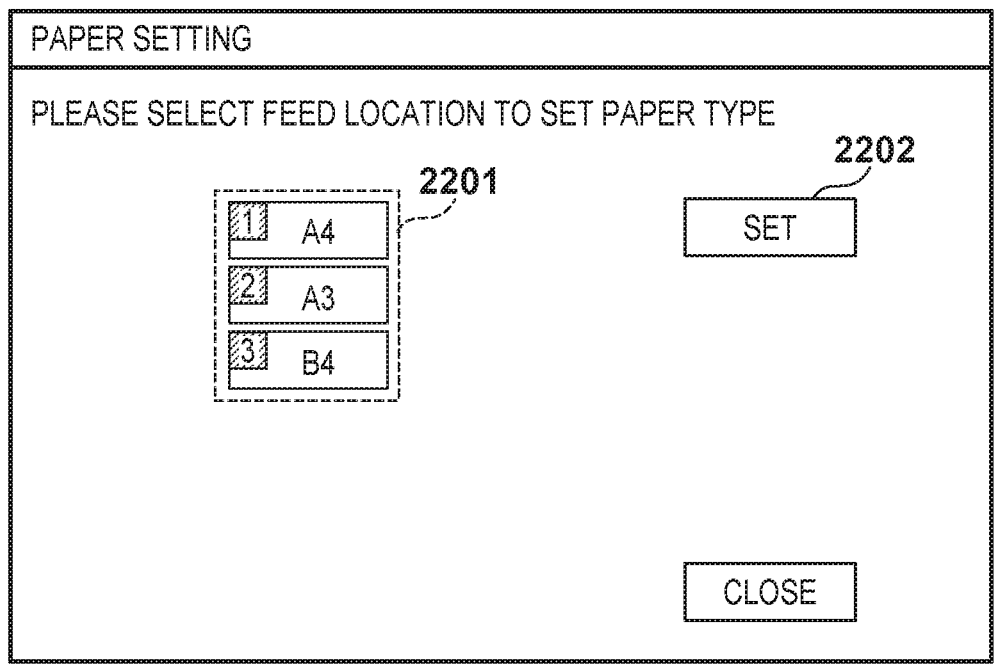
FIGS. 22A, 22B and 22C depict views for showing examples of screens for a user to operate when setting paper information for a paper feed cassette in the third embodiment.
Figure 22B:
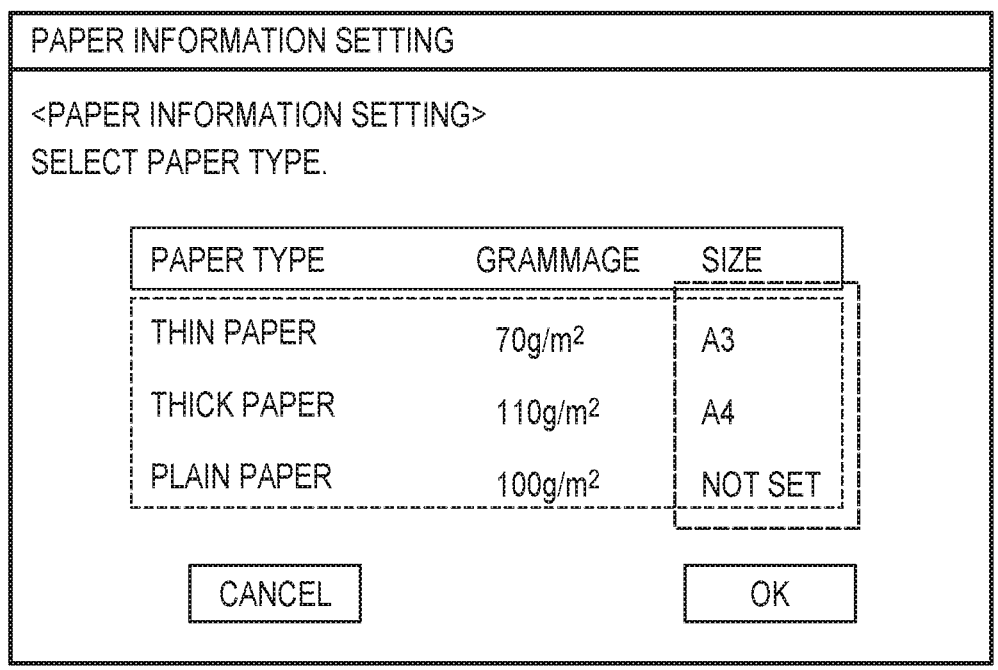
Figure 22C:
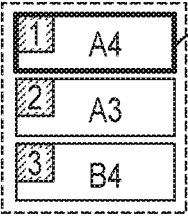

FIGS. 22A, 22B and 22C depict views for showing examples of screens for a user to operate when setting paper information for a paper feed cassette (sheet holding unit) in the third embodiment.

FIG. 22A depicts a view for illustrating an example of a screen for selecting the paper feed cassette for which to set paper information. A user selects a change target paper feed cassette from out of the group of buttons 2201 of FIG. 22A, and presses a set button 2202. With this, a screen for setting the paper information for the selected paper feed cassette is displayed as illustrated in FIG. 22B, for example.

In FIG. 22B, the user selects desired paper information from the group of buttons 2206 and presses an OK button. With this, in cases where a mismatch occurs between the paper size auto-detected in the specified paper feed cassette, and the paper size of the paper information set for the paper feed cassette via the screens of FIG. 22A and FIG. 22B, for example, a screen shown in FIG. 22C is displayed. In FIG. 22C, as shown in numeral 2209, a paper size mismatch is indicated to have occurred in a first paper feed cassette.

Note, in the screen example of FIGS. 22A to 22C, the type of paper is displayed by characters, but this may be displayed by icons, illustrations, or the like.

Figure 23:
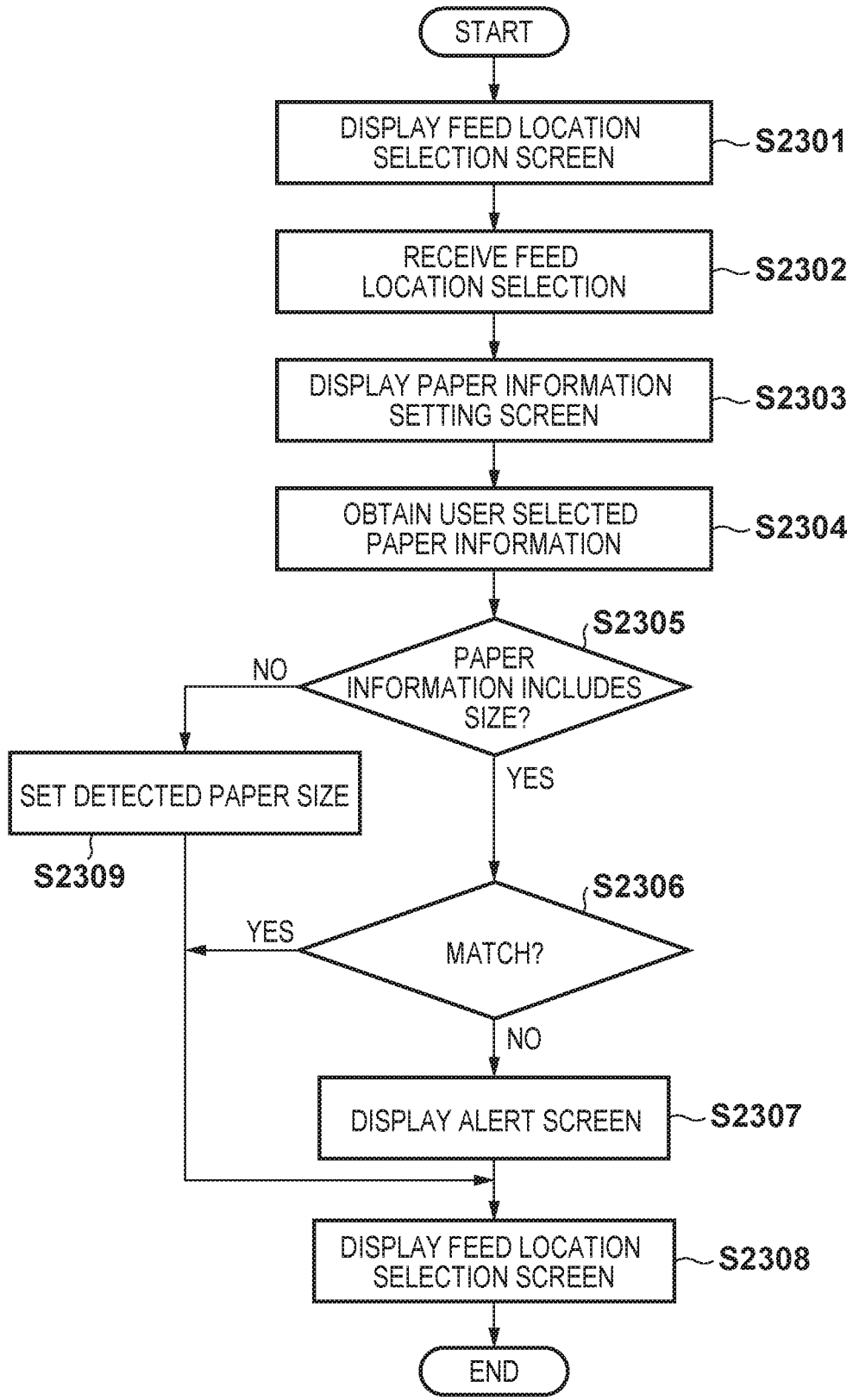
FIG. 23 is a flowchart for describing processing for when a mismatch between an auto-detected paper size and a paper size set in paper information occurs in the image forming apparatus according to the third embodiment.

FIG. 23 is a flowchart for describing processing for when a mismatch between an auto-detected paper size and a paper size set in paper information occurs in the image forming apparatus according to the third embodiment. Note, the processing illustrated in the flowchart is executed by a program that executes the processing being installed in the disk 1211, loaded into the memory 1202 upon execution, and executed under the control of the CPU 1201.

Firstly, in step S2301, the CPU 1201 displays a screen for selecting a paper feed location on the display unit 1203 as shown in FIG. 22A, for example. Then, the processing proceeds to step S2302, and the CPU 1201 receives an instruction for the paper feed cassette that the user selected when the user selects the paper feed cassette and presses the setting button 2202 on the screen of FIG. 22A. Then, the processing proceeds to step S2303, and the CPU 1201 displays the paper information setting screen as shown in FIG. 22B, for example. Then, the processing proceeds to step S2304, and the CPU 1201 obtains the paper information that the user selected on the paper information setting screen. Then, the processing proceeds to step S2305, and the CPU 1201 determines whether or not the set paper information includes the paper size. Because in the example of FIG. 22B the size is "not set" in the case where the paper is plain paper, it is necessary to confirm whether or not the paper size exists, for example. If the size is set, the processing proceeds to step S2306, and the CPU 1201 compares the set paper size, and the size of the paper detected to be loaded into the paper feed cassette selected in step S2302, and determines whether or not they match. Here, when the CPU 1201 determines that these do not match, the processing proceeds to step S2307, and it displays an alerting screen on the display unit 1203 of the console unit 1106.

Note, when the CPU 1201, in step S2305, determines that the set paper information does not include the paper size, the processing proceeds to step S2309. In step S2309, the CPU 1201 sets the paper size detected by the guides 1603 and 1604 as shown in FIG. 16 as the paper size of the paper feed cassette, and the processing proceeds to step S2308. Also, when, in step S2306, it is determined that the set paper size, and the paper size actually loaded into the paper feed cassette match, the processing proceeds to step S2308.

In step S2308, the CPU 1201 displays a screen as is shown in FIG. 22A. With this, if the user wishes to cancel the mismatching size situation, the user once again performs the processing from the selection of the paper feed cassette. Also, when the sizes are matching, the user presses a close button on the screen of FIG. 22A.

Note, a shortcut button may be arranged on the screen of FIG. 22C for transitioning to the screen of FIG. 22A. With this, the user is able to cancel a state in which the size of the paper actually loaded into the paper feed cassette, and the paper size of the paper information set for the paper feed cassette are inconsistent with simple operations.

Figure 24:
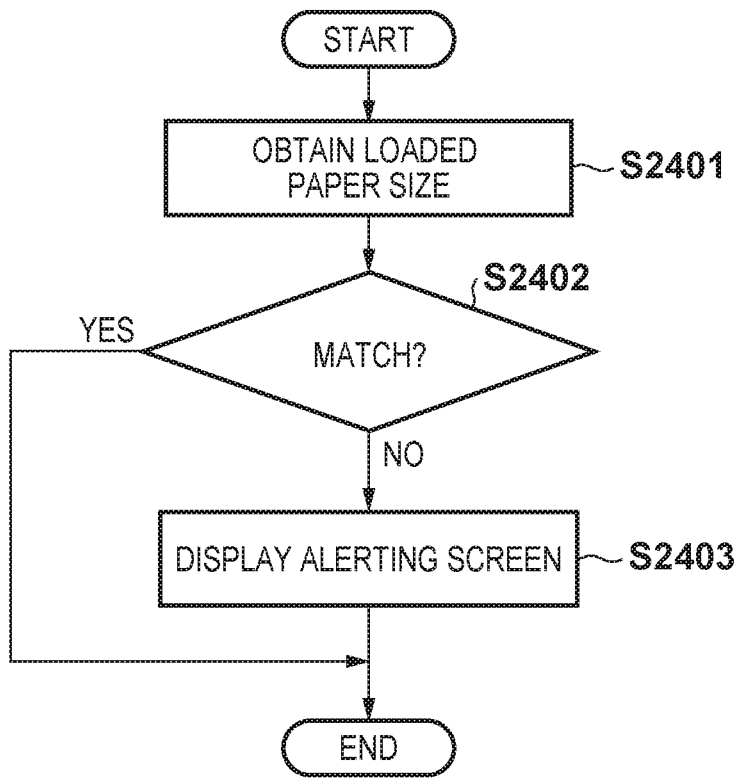
FIG. 24 is a flowchart for showing processing when a paper size mismatch occurs upon detection of opening or closing of a paper feed cassette door, or the pulling out/ putting in of a cassette in the image forming apparatus according to the third embodiment.

FIG. 24 is a flowchart for showing processing when a paper size mismatch occurs upon detection of opening or closing of a paper feed cassette door, or the pulling out/ putting in of a cassette in the image forming apparatus according to the third embodiment. Note, the processing illustrated in the flowchart is executed by a program that executes the processing being installed in the disk 1211, loaded into the memory 1202 upon execution, and executed under the control of the CPU 1201.

Firstly, in step S2401, the CPU 1201 automatically detects the size of the paper loaded into the paper feed cassette with the guides 1603 and 1604 of the paper feed cassette. Next, the processing proceeds to step S2402, and the CPU 1201 determines whether or not the size of the paper automatically detected to be loaded in step S2401, and the paper size of the paper information set by the user via the screens of FIG. 22A and FIG. 22B match. When, in step S2402, the CPU 1201 determines that the sizes do not match, the processing proceeds to step S2403, and the CPU 1201 alerts the user by displaying an alerting screen (FIG. 22C).

Note, it is advantageous that the paper feed cassette for which the mismatch in sizes occurs be made such that the user cannot use it for printing for error handling. For example, configuration may be taken such that the user cannot use the paper feed cassette for which the size mismatch occurred for printing by handling the paper feed cassette similarly to when an out of paper error occurs. Also, a paper feed cassette for which a size mismatch occurred may be handled in a distinguishable way to other errors. Also, in step S2402, in cases where the paper information set by the user does not include the paper size, similar processing may be performed to step S2309 of FIG. 23.

As explained above, by the third embodiment, in cases where the size of the paper included in paper information set for a paper feed cassette, and the size of the paper loaded into the paper feed cassette do not match, the user can be notified to that effect.

Also, by displaying an alerting screen (FIG. 22C) to the user at a timing at which the user sets paper information for the paper feed cassette, or at a timing at which a guide of the paper feed cassette is moved, the user can notice the mismatching state easily.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2013-55414, filed Mar. 18, 2013, and Japanese Patent Application No. 2014-028967, filed Feb. 18, 2014, which are hereby incorporated by reference herein in their entirety.

What is claimed is:

1. A printing apparatus that prints an image on a sheet conveyed from a sheet holding unit, the printing apparatus comprising:
   a storage that stores a plurality of pieces of sheet information, wherein each of the plurality of pieces of sheet information includes a grammage of a sheet;
   a controller that sets, in association with the sheet holding unit, one piece of sheet information selected by a user from the plurality of pieces of sheet information stored in the storage; and
   a user interface that receives a size of a sheet,
   wherein, in a case that the user interface receives the size of the sheet and a registration instruction for registering a new one piece of sheet information in the storage, the printing apparatus registers the new one piece of sheet information in the storage with size information indicating the size of the sheet received by the user interface,
   wherein, in a case that the user interface receives the registration instruction for registering the new one piece of sheet information in the storage but does not receive the size of the sheet, the printing apparatus registers the new one piece of sheet information in the storage without size information indicating the size of the sheet, and
   wherein, in a case that the controller sets the new one piece of sheet information registered in the storage without the size information in association with the sheet holding unit, the controller sets the grammage included in the new one piece of sheet information and size information indicating a size of the sheet detected by a size detector that detects a size of the sheet that is held in the sheet holding unit in association with the sheet holding unit.

2. The printing apparatus according to claim 1, wherein, in a case that the controller sets the new one piece of sheet information registered in the storage with the size information in association with the sheet holding unit, and the size information does not match size information indicating a size of a sheet held in the sheet holding unit detected by the size detector, the controller provides a notification of inconsistency.

3. The printing apparatus according to claim 2, wherein the size detector is implemented for the sheet holding unit.

4. The printing apparatus according to claim 2, further comprising:
   a detector that detects an opening or a closing of the sheet holding unit,
   wherein the notification of inconsistency is performed in accordance with the detector detecting the closing of the sheet holding unit.

5. The printing apparatus according to claim 1, wherein the sheet information further includes information indicating a sheet type.

6. The printing apparatus according to claim 1, further comprising a plurality of sheet holding units,
   wherein the controller sets, in association with the sheet holding unit selected by the user from among the plurality of sheet holding units, the one piece of sheet information selected by the user from the plurality of pieces of sheet information registered in the storage.

7. A method of controlling a printing apparatus that prints an image on a sheet conveyed from a sheet holding unit and which comprises (i) a storage that stores a plurality of pieces of sheet information, wherein each of the plurality of pieces of sheet information includes a grammage of a sheet, and (ii) a user interface that receives a size of a sheet, the method comprising:
   registering, in a case that the user interface receives the size of the sheet and a registration instruction for registering a new one piece of sheet information in the storage, the new one piece of sheet information in the storage with size information indicating the size of the sheet received by the user interface;
   registering, in a case that the user interface receives the registration instruction for registering a new one piece of sheet information in the storage but does not receive the size of the sheet, the new one piece of sheet information in the storage without size information indicating the size of the sheet; and
   setting,
   in a case that the new one piece of sheet information registered without the size information is set in association with the sheet holding unit, the grammage included in the new one piece of sheet information and size information indicating a size of the sheet detected by a size detector that detects a size of the sheet that is held in the sheet holding unit in association with the sheet holding unit.

8. A non-transitory computer readable storage medium for storing a computer program for controlling a printing apparatus which prints an image on a sheet conveyed from a sheet holding unit and which comprises (i) a storage that stores a plurality of pieces of sheet information, wherein each of the plurality of pieces of sheet information includes a grammage of a sheet, and (ii) a user interface that receives a size of a sheet, the computer program comprising:
   registering, in a case that the user interface receives the size of the sheet and a registration instruction for registering a new one piece of sheet information in the storage, the new one piece of sheet information in the storage with size information indicating the size of the sheet received by the user interface;
   registering, in a case that the user interface receives the registration instruction for registering a new one piece of sheet information in the storage but does not receive the size of the sheet, the new one piece of sheet information in the storage without size information indicating the size of the sheet; and
   setting,
   in a case that the new one piece of sheet information registered without the size information is set in association with the sheet holding unit, the grammage included in the new one piece of sheet information and size information indicating a size of the sheet detected by a size detector that detects a size of the sheet that is held in the sheet holding unit in association with the sheet holding unit.

* * * * *